United States Patent [19]

Archer et al.

[11] Patent Number: 4,873,625
[45] Date of Patent: Oct. 10, 1989

[54] METHOD AND APPARATUS FOR EXTENDING COLLATION FUNCTIONS OF A SORTING PROGRAM

[75] Inventors: Gary D. Archer, Campbell, Calif.; Eugene G. Huff, Raleigh, N.C.; Miguel T. Madrid, Jr., San Jose, Calif.; Akio Yoshii, Tokyo, Japan

[73] Assignee: International Business Machines Corporation, Armonk, N.Y.

[21] Appl. No.: 121,465

[22] Filed: Nov. 17, 1987

[51] Int. Cl.$^4$ ............................................. G06F 7/00
[52] U.S. Cl. ............................ 364/200; 364/222.81; 364/222.9
[58] Field of Search ... 364/200 MS File, 900 MS File

[56] References Cited

U.S. PATENT DOCUMENTS

| 4,251,871 | 2/1981 | Yu | 364/518 |
| 4,507,734 | 3/1985 | Kaldas | 364/419 |
| 4,587,628 | 5/1986 | Archer et al. | 364/900 |
| 4,604,710 | 8/1986 | Amezcua et al. | 364/900 |

OTHER PUBLICATIONS

IBM Data Processing Glossary, Sixth Edition (Oct. 1977), p. 186.
OS/VS Sort/Merge Program-Kanji/Chinese RPQ Reference No. 7F0094 Program Description and Operation Manual, Program No. 5779-BAZ, IBM Publication SH18-0016-0, First Edition, Jun. 1980.

Primary Examiner—Gary V. Harkcom
Assistant Examiner—Michael A. Jaffe
Attorney, Agent, or Firm—Baker, Maxham, Jester & Meador

[57] ABSTRACT

A method and means for extending the collation functions of a sorting program (SORT) enable the program to permute, combine, or filter input records having collating characteristics that are not recognized by the SORT program. The extension includes provision of an extended function support program (EFS) that can be invoked by and concurrently executed with the sorting program. The EFS program is provided with a modality for modifying control statements received by the SORT program but executable only against records having the non-recognized collating characteristics. The EFS program modifies such control statements to a form executable by the SORT program. The EFS program also is provided with the capability of modifying the collating characteristic fields of records which are to be processed by the SORT program, the modification resulting in the provision of the records of counterpart collating characteristics recognized by the SORT program. The SORT program is thereby enabled to SORT/MERGE input strings of records with non-recognized collating characteristics into output strings including such records. The EFS program is also invoked by the sorting program to perform conditional filtration of input records having non-recognized collating characteristics, which enables the SORT program to assemble an output list of filtered records with non-recognized characteristics. This permits the SORT program to perform INCLUDE/OMIT functions on records with non-recognized collating characteristics.

12 Claims, 11 Drawing Sheets

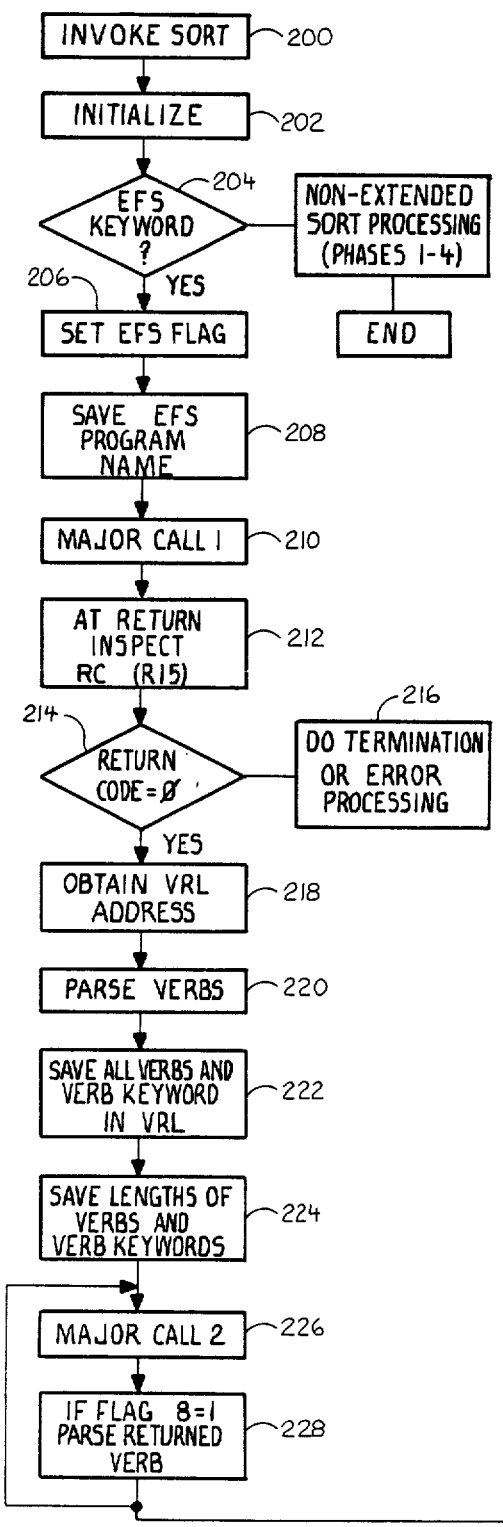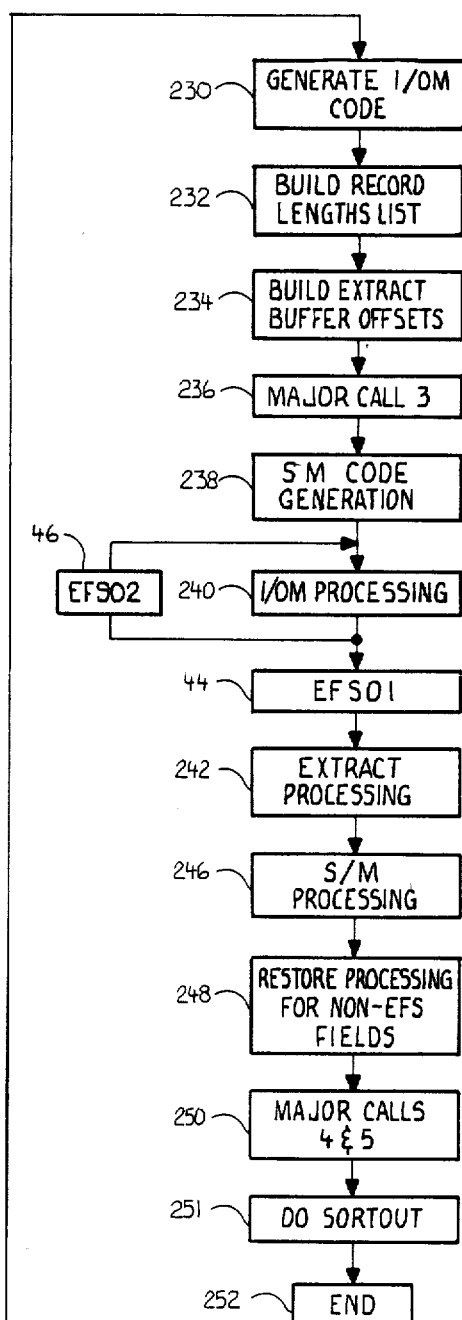
FIGURE II

METHOD AND APPARATUS FOR EXTENDING COLLATION FUNCTIONS OF A SORTING PROGRAM

BACKGROUND OF THE INVENTION

The field of the invention covers a method and apparatus for extension of collation functions of a sorting program to records having collating characteristics not recognized by the sorting program. More particularly, this invention provides an improved sorting program for performing SORT/MERGE or INCLUDE/OMIT functions on input strings of records possessing collating characteristics foreign to the sorting program.

In the prior art, sorting programs are understood to be software entities executable upon computing systems for the purpose of selectively collating input record strings to produce output record strings. In this regard, collating is taken in its broad sense to include the arrangement or assembly of records according to an orderly system. For example, input lists of alphanumeric records having a random order are collated by a sorting program to produce alphanumerically-processed output lists. Such output lists might include all of the input records in alphabetical order in a single output file, a single alphabetized list produced by combining a plurality of input lists, or a filtered list which includes only records meeting certain comparison conditions. In this latter regard, such a list might include constructing a file of San Diego, Calif. addresses from a mailing list embracing all of the United States.

In the context of the invention to be described below, the collating functions of a sorting program include those functions characteristically associated with sort program control statements such as SORT, MERGE, INCLUDE, and OMIT. Implementations of these sorting program collating functions can be understood with reference to descriptions of identically-named verbs in the IBM sorting program DFSORT, as described in DFSORT (Data Facility Sort) Program Product No. 5740-SMI Application Programming Guide: R8.0, Order No. SC33-4035.

The use, operation, and application environment of the DFSORT program are also described in detail in U.S. Pat. No. 4,587,628 of Archer et al., assigned to the assignee of this application. The Archer et al. patent is incorporated in whole by reference into this application.

As is known, collating functions performed by sorting programs are executed against records having collating characteristics that are recognized by the sorting program. In this regard, EBCDIC or ASCII coding are among the most widely-understood systems of collating characteristics. Indeed, IBM's DFSORT program performs its collating functions on data records having control fields containing EBCDIC or ASCII code characters. This provides the DFSORT program with the ability to perform collating functions on input strings of records comprising characters drawn from the English alphabet and the decimal and binary numbering systems. However, EBCDIC or ASCII-based sorting programs do not recognize written characters drawn from non-English alphabets. Thus, without adaptation or extension of its collating facilities, an EBCDIC or ASCII-based sorting program cannot collate an input string of data elements formed from, for example, Kanji characters. Manifestly, the ability to process input lists of records drawn from a variety of national alphabets would substantially increase the market appeal and considerably heighten the usefulness of sorting programs.

One successful adaptation of a sorting program to the collation of non-EBCDIC data elements is the OS/VS SORT/MERGE program-Kanji/Chinese, described in IBM Publication No. SH18-0016-0, "OS/VS SORT/MERGE PROGRAM-KANJI/CHINESE," RPQ Reference No. 7F0094 Program Description and Operation Manual. Hereinafter this program is referred to as SORT/MERGE-Kanji/Chinese (SMKC). The SMKC program performs input processing on non-EBCDIC record lists, invokes a sorting program such as the IBM OS/VS SORT/MERGE program or the DFSORT program to collate the processed records, and then performs output processing on the records to provide output files. The SMKC program, therefore, treats the DFSORT sorting program as an adjunct process, callable when needed. However, this program imposes a substantial overhead burden on the facilities that support its execution, results in a proliferation of resources to support of collation of record sets with divergent collating characteristics, and fails to take advantage of the superior input/output processing capability of the DFSORT sorting program.

The prior art SMKC program provides for modification of input string data elements through the translation of Japanese-language collating characteristics to counterpart binary data characteristics, which enables the called OS/VS SORT/MERGE sorting program to permute or combine input strings of Japanese-language characters. This translation is accomplished by means of reference to a variety of collating sequence tables which map Japanese-language collating characteristics into binary data counterparts. However, in the prior art SMKC program, no provision is made for altering control statements to forms executable by a sorting program such as OS/VS SORT/MERGE or DFSORT.

SUMMARY OF THE INVENTION

This invention is founded on the important observation by the inventors that adaption of the control mechanization of a sorting program, such as DFSORT, permitting it to recognize and respond to non-EBCDIC records would provide a single point of access to computer collating resources through the sorting program, and retain for the user the benefit of the superior input/output processing of the sorting program. In the invention, the adaptation is provided by an extended function support (EFS) program. The EFS program is executable against data records with EBCDIC or ASCII characteristics. It also has the ability to modify sorting program control statements executable only against data records having collating characteristics not recognized by the sorting program, the modification being to a form which is executable by the sorting program. In addition, the translation of collating characteristics to counterpart collating characteristics recognized by the sorting program is also performed by the EFS program. This enables the sorting program to execute against foreign record sets by incorporating the EFS control statement modification into its own verb parsing procedure, and by integrating the collation characteristic translation into its process for collation processing of records. From this aspect, the invention is a method for operating a computer system under control of a first process (SORT) which processes from an input file to an output file only data records having first predetermined collating characteristics, the method operating the computer system in response to an input file including second records having second predetermined collating characteristics. A second process (EFS) is provided which includes a modality for modifying control statements and records. The input file of second records is received at the first process together with a set of control statements for operating on the input file, the control statements including a subset executable only on records with the second predetermined collating characteristics. e statements is passed to the second The subset of control process whereat the statements of the subset are mitered to obtain commands executable by the first process. At the first process, finally, the subset of altered control statements is executed against the input file to produce an output file including the records with the second predetermined collating characteristics. This aspect of the invention further includes the passing of the input file embracing the second records to the EFS process and, at the EFS process, generating from that input file a counterpart file of records having the first collating characteristics. Within the limitation of these steps, the execution of the subset of altered control statements includes, at the first process, executing the subset against the counterpart file of records to produce an output file from the input file of second records.

Viewed from another aspect, the invention is concerned with the concurrent execution of a string process and a cooperating sequential process on a computing system, wherein the first process is adapted to generate commands for permuting only a string of records with first collating characteristics in response to control statements executable by the first process against those records, and wherein the second process includes a modality for altering control statements. In this aspect of the invention, a set of control statements and an input string of records including second records with second collating characteristics are provided to the first process, with the control statement set including a subset of control statements executable only on records having the second collating characteristics. The subset of control statements is passed to the second process where the control statements of the subset are modified to a form executable by the first process against records with first collating characteristics. The input string is then passed to the second process where counterpart first collating characteristics are added to the second records. Finally, at the first process, the input string is permutatively processed into an output string including the second records by executing the modified control statements against the counterpart collating characteristics added to the input string records.

Finally, the invention can be considered from the point of view of a method for concurrently executing a first and second cooperating sequential process on a computing system, where the first process is adapted to generate commands for forming an output string of data elements from an input string of data elements having first collating characteristics in response to control statements executable by the first process, and where the second process includes a modality for altering control statements. This form of the invention includes provision to the first process of a set of control statements and an input string of data elements including second data elements with second collating characteristics, with the set of control statements including a subset of control statements executable only on data elements having the second collating characteristics. The subset of control statements is provided to the second process where the subset control statements are modified to a form executable by the first process against data elements with the first collating characteristics. Then, in response to the modified control statements, the first and second processes are concurrently executed against the input file to filter the second data elements Finally, at the first process, an output file including the filtered second data elements is formed.

An objective of this invention is therefore to provide for the extension of the collating functions of a sorting program to the sorting, merging, and conditional filtration of input strings of data elements having collating characteristics foreign to the sorting program.

A further objective is to provide to a sorting program an extended function support that includes the ability to modify control statements provided to the sorting program which reference data elements having collating characteristics not recognized by the sorting program to a form executable by the sorting program against such data elements.

Other objects and distinct advantages of the invention will become evident with a reading of the description provided below with reference to the drawings, in which.

Figure 12:
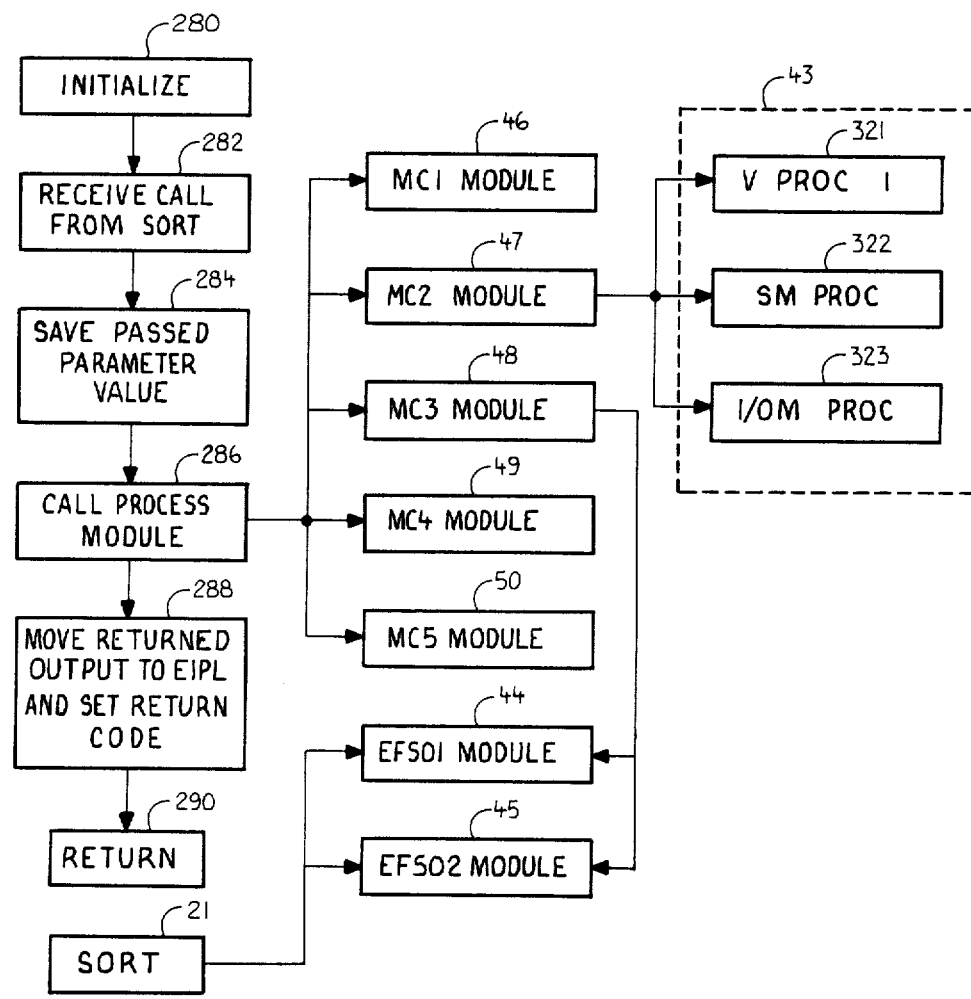
Figure 13:
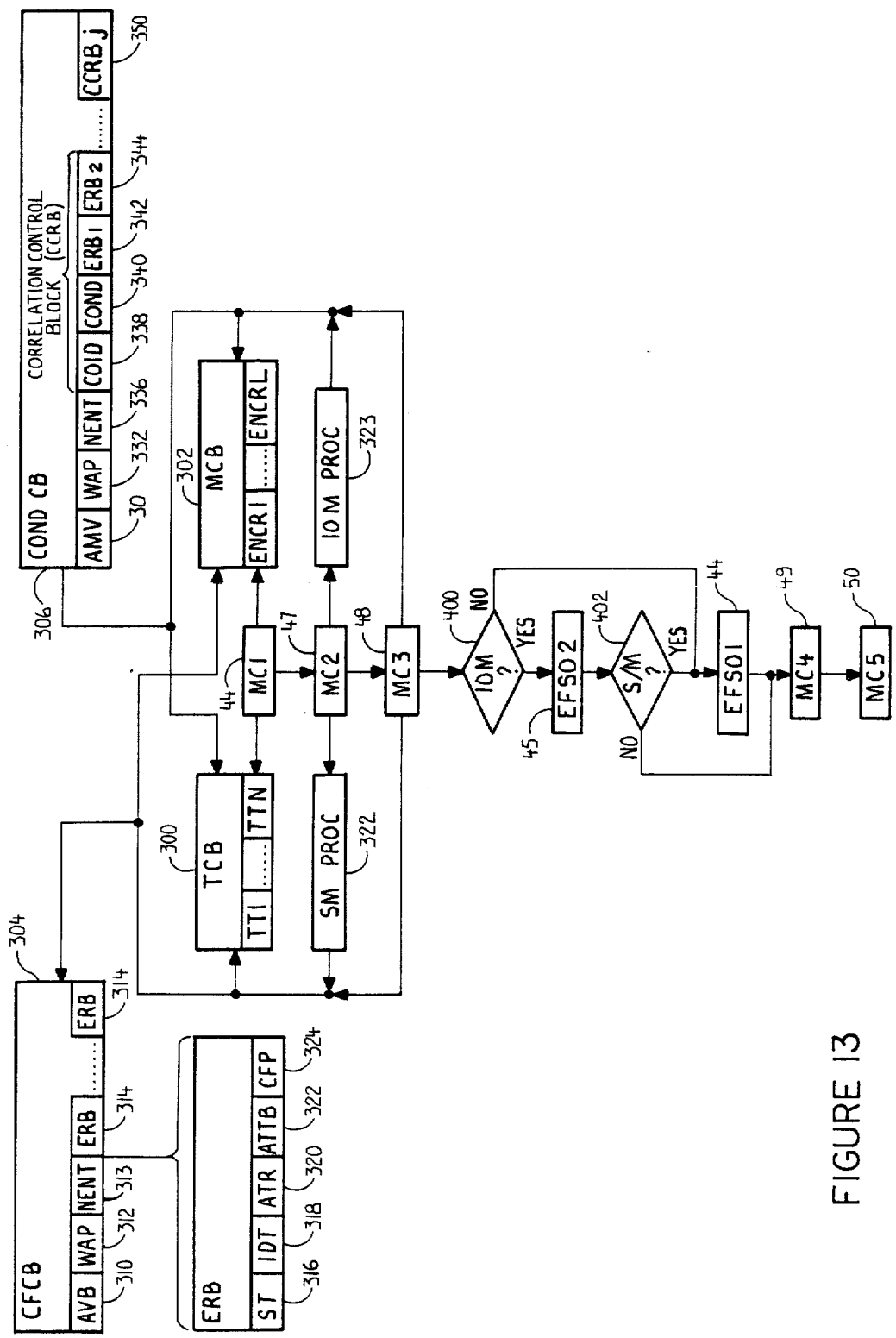
Figure 14:
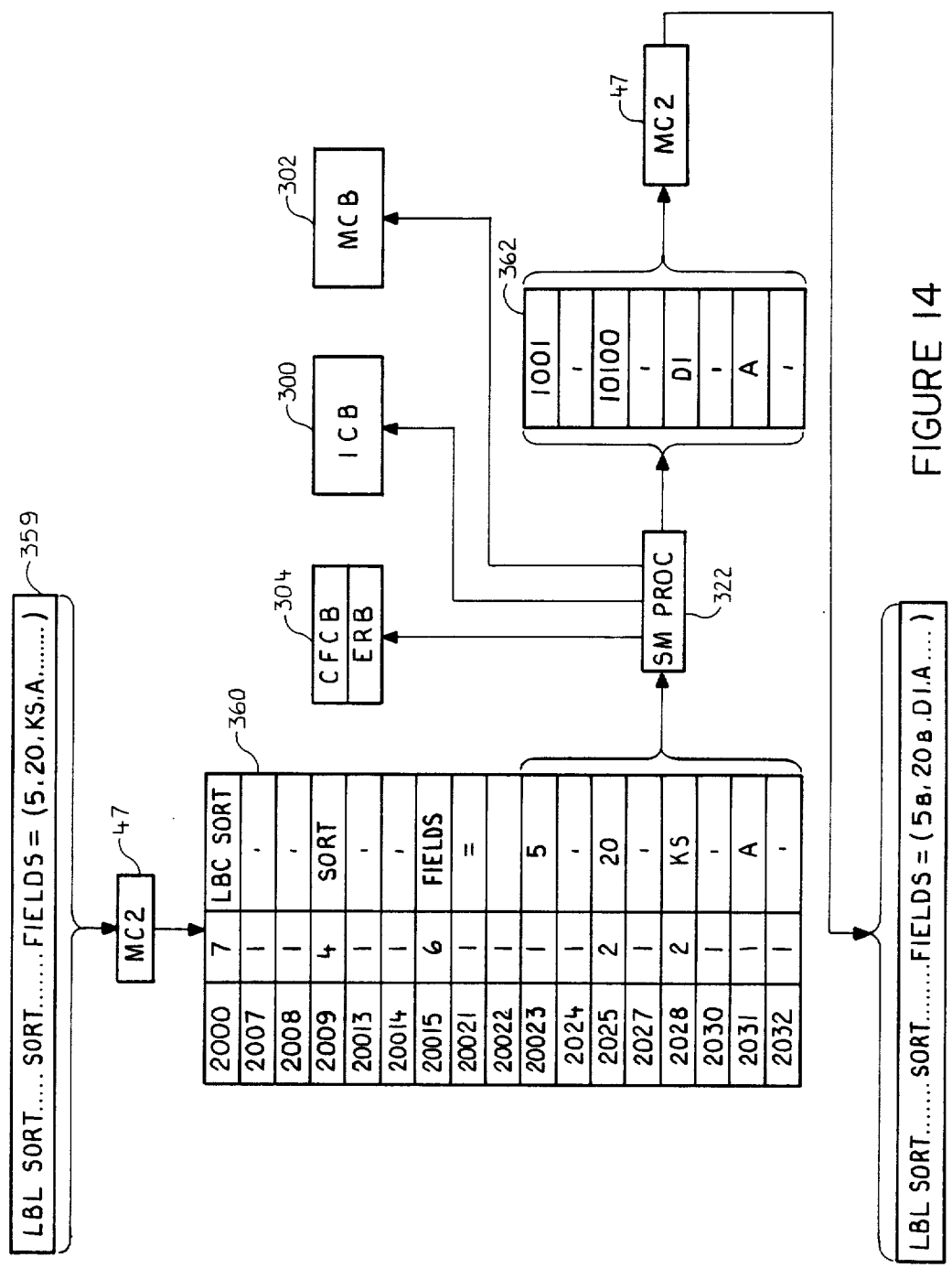

FIGS. 11 and 12 constitute a flow diagram illustrating the method of the invention;

FIG. 13 is a schematic flow diagram illustrating control blocks, routines, and data areas defining the operation of the extended function program; and FIG. 14 is a schematic flow diagram illustrating processes and data structures involved in the modification of verbs by the extended function program.

DESCRIPTION OF THE PREFERRED EMBODIMENT

Figure 1:
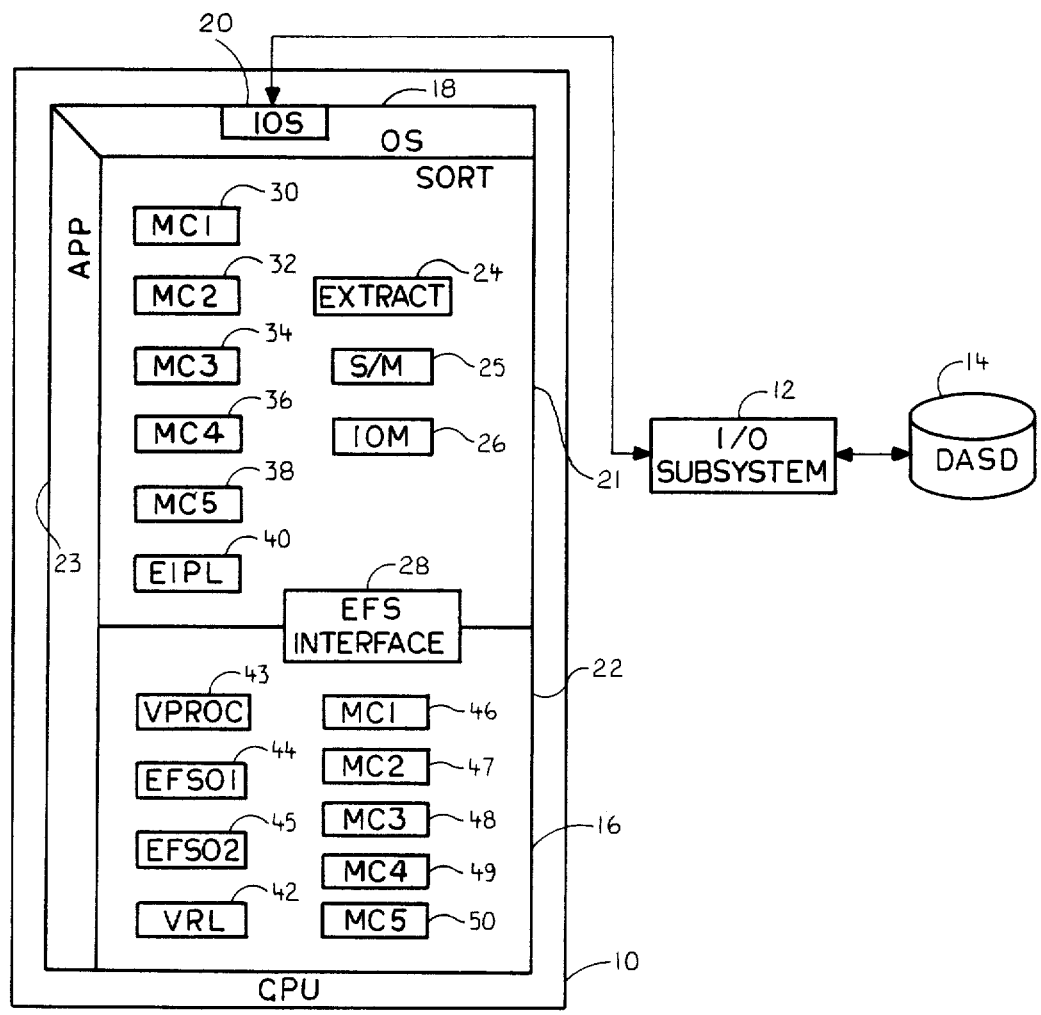
FIG. 1 is an illustration of a system environment including a central processor with a virtual storage address space.

The invention is intended to operate in a computer system environment illustrated in FIG. 1. By way of introduction, the computer system of FIG. 1 includes at least one central processing unit (CPU) 10, an input/output (I/O) subsystem comprising an I/O channel, an I/O control unit, a direct access storage device (DASD), and other I/O devices as are necessary to the functionality of the computing system. Such a computing system is described, for example, in U.S. Pat. No. 3,400,371 of Amdahl et al., issued Sept. 3, 1968 and incorporated herein by reference. An Amdahl computing system generally includes the elements just listed, together with an operating system—software that controls the execution of computer programs and the management of computer system resources including main storage, I/O apparatuses, the CPU, and any data used in execution of programs. Processors which can serve as the CPU include IBM System/370 processors operating in 24-bit addressing architecture or any IBM processor incorporating extended architecture (XA), which provides for 31-bit addressing of storage. An operating system which executes the sorting system of the invention can include IBM OS/VSl, oS/VS2 MVS, MVS/XA, or any of these running as hosts under VM/370 or VM/XA. Storage devices or facilities providing for input and output file storage and in-process file storage for data sets can include IBM tape units of the 2400 or 3400 series, or DASD or DASF (direct access storage facilities) of the 2314, 3330, 3340, 3350, 3375, 3380 series or the 3850 storage subsystem.

With reference now to FIG. 1, the computing system upon which the invention may be executed includes a CPU 10, and I/O subsystem 12, and a direct access storage device (DASD) 14. Data is communicated between the CPU 10 and the DASD 14 under control of the I/O subsystem 12. In operation, the CPU 10 embraces a virtual storage, a diagrammatic illustration of which includes a virtual memory map 16 The virtual memory map 16 represents the electrical signals stored in the CPU 10 forming the operating system 18, which includes an I/O subsystem interface control program 20, a sorting program (SORT) 21, an extended function support program (EFS) 22, and an application program 23.

The practice of the invention involves the execution of the sorting program 21 in cooperation with the execution of the EFS program 22. Therefore, the interfaces between the two programs which support their concurrent execution include, in the sorting program, an extract process 24, a SORT/MERGE (S/M) process 25, an INCLUDE/OMIT (IOM) process 26, major call logic modules 1, 2, 3, 4, and 5, numbered as 30, 32, 34, 36, and 38, respectively, and an EFS interface parameter list (EIPL) 40. Other processing structures included in the sorting program 21 are described in the incorporated Archer patent. These including the provision for invocation of the sorting program by either the application program 23 or by means of a job control language (JCL) program conventionally introduced into the CPU 10. As is known, the sorting program of the incorporated Archer patent possesses extremely efficient input and output processes, and it is understood that these structures are incorporated in the sorting program 21. However, since they have been completely disclosed in the prior art, the skilled artisan will understand their operation and significance in the execution of the sorting program 21 without further explanation in this description.

The concurrent execution of the sorting program 21 and the EFS program 22 is supported by a control mechanization in the form of an EFS interface structure 28 comprising logic in both of the programs 21 and 22.

The principal processes in the EFS program 22 that support the sorting program 21 in the collation of data elements having collating characteristics not recognized by the program 21 are a verb request list (VRL) 42, a control statement or verb processing module (VPROC) 43, a first exit EFS01 44, a second exit EFS02 45 and logic modules 46–50 for responding to major calls 1–5, respectively.

Figure 2:
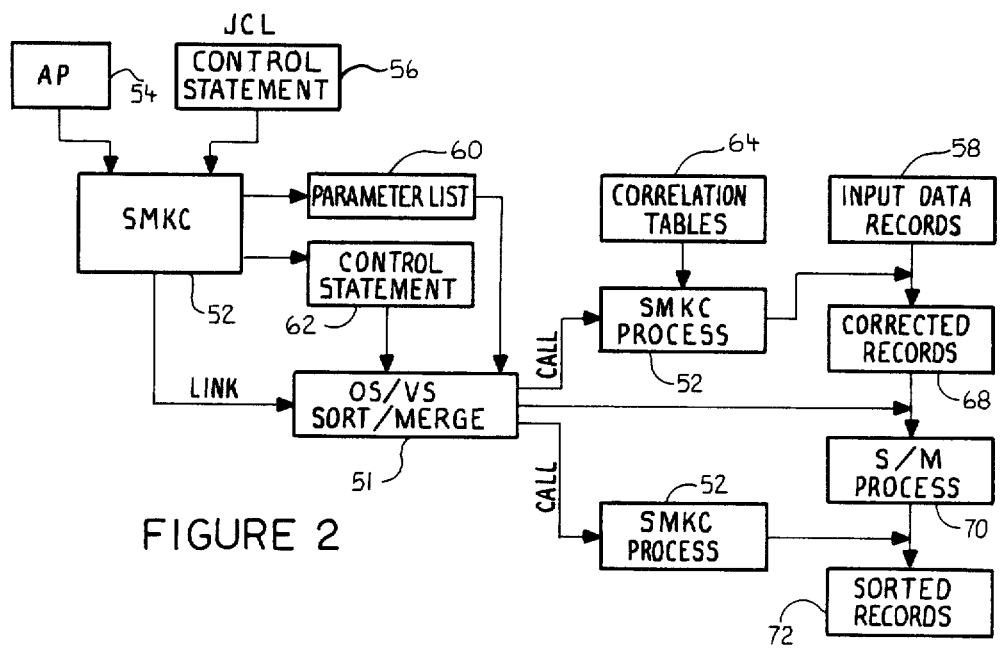
FIG. 2 is schematic illustration of the process interface and flow between a prior art EBCDIC/ASCII-based sorting program and a Kanji-based sorting program.

With reference now to FIG. 2, a description will be given of the sorting of non-EBCDIC data by a prior art sorting program that recognizes only EBCDIC or ASCII collating characteristics. The prior art sorting program is exemplified by the IBM OS/VS SORT/MERGE program 51. A prior art SORT/MERGE-Kanji/Chinese (SMKC) program 52 is used to support sorting or merging of strings of input records comprising Japanese-language data elements into output strings. In this regard, the terms data element, data record, and record are used interchangeably to denote the basic data unit which is operated on to conduct a collating process. A file is a set of related data elements, data records, or records treated as a unit. More generally, a file corresponds to a data set which consists of a collection of data in an arbitrary arrangement.

In an abstract sense, the files which are processed by a sorting program are arranged in a linear sequence, which may be characterized as a string of records, data records, or records.

In use, when an input string of Japanese-language records is to be sorted or merged, the SMKC 52 is invoked either indirectly by way of an application program written in a programming language such as Assembler, PL/I, or COBOL. When indirectly invoked, SMKC 52 is executed as a subprogram of the invoking application. Alternatively, the SMKC program 52 can be executed as a job step in a job control language (JCL) program including the data file to be sorted or merged together with a set of job control statements that direct the operating system in execution of the sorting program In the prior art, when the SMKC 52 is invoked directly, it is executed as a job step indicated by the "PGM=" field of an EXEC job control statement JCL invocation is symbolized in FIG. 2 by the control statement 56.

However invoked, SMKC 52 is used to sort or merge an input file of mixed data including Japanese-language data elements or records. SMKC 52 uses the sorting program 51 as a subprogram. As a calling routine, SMKC 52 is linked to the sorting program 51 during assembly. A parameter list 60 supports calls to the sorting program 51 during SORT/MERGE processing of input data files. In addition, SMKC 52 parses all input control statements, generating sorting program control statement 62 appropriate to called sorting program 51 to conduct the necessary SORT/MERGE operations 51.

In addition to calling the sorting program 51 as a subroutine, the SMKC 52 also modifies the records in the input data file 58 in order to provide them with collating characteristics recognized by the sorting and merging procedures of the program 51. Relatedly, the SMKC 52 refers to a set of correlation tables 64 to effect the record correction in response to a call from the sorting program 51. The corrected records 68 are then made available to the sorting program 51, which is called to execute the appropriate sorting or merging process 70 on the corrected records. The S/M process 70 (a process module of the sorting program 51) arranges the corrected records 68 as required to provide a set of sorted records 72. The sorting program 51 then relinquishes program control, which reverts back to the SMKC 52 for processing of the sorted records into output data files.

Figure 3:
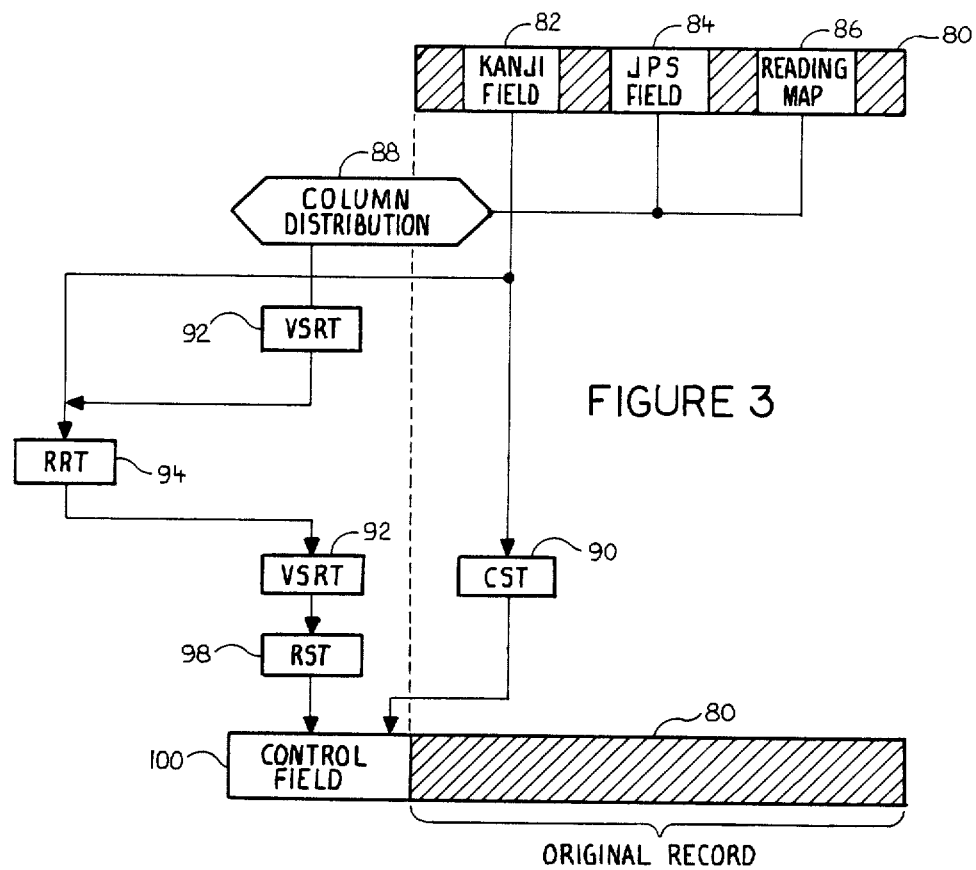
FIG. 3 is a schematic diagram illustrating how the Kanji sorting program of FIG. 2 translates Japanese-language collating characteristics to EBCDIC/ASCII collating characteristics.

FIG. 3 illustrates the general process of modifying the correlation characteristics of Japanese-language data records according to the prior art SMKC 52. A data record 80 may comprise one or more control fields, each control field containing a predetermined type of collating data to be used for conducting a collating procedure. One such record is 80 and embraces three control fields—a Kanji field 82, a Japanese phonetic syllabary field (JPS field) 84, and a reading map field 86. The SMKC 52 refers to four translation tables—a collating sequence table (CST) 90, a voiceless sound resolution table (VSRT) 92, a representative reading table (RRT) 94, and a reading sequence table (RST) 98—in modifying the record collating characteristics contained in the control fields 82, 84, and 86. A column distribution procedure 88 is used to address the tables 92, 94, and 98 in mapping the Japanese language collating characteristics of the control fields 84 and 86, while the Kanji field 82 is used for direct entry into the tables 90 and 94. The prior art record correction process in the SMKC 52 creates a control field 100 that is appended to the original record 80. The control field 100 is an EBCDIC representation of the product of the translation process, and provides collating characteristics recognized by the sorting program 51. The tables 90, 92, 94, and 98 are structured in such a manner as to map the Japanese-language fields 82, 84, and 86 into any one of four recognized types of sequencing. The four types are the basic sequence type, based upon a count of strokes which make up Japanese Kanji characters, the Japanese dictionary sequence, the Kanji index sequence, and the Japanese telephone directory sequence. These four sequences are essentially linear; thus, they can be mapped to a conventional linear EBCDIC (or AScII) collating sequence, With the control field of each corrected record containing the EBCDIC (or ASCII) sequence representative corresponding to the Japanese-language characteristic of the original record. The corrected records are thus processed by the sorting program 51 operating solely on the translated control fields. Once the sorting is done, the sorted records are processed by the SMKC 52 by removing the control fields 100 and then outputting the sorted, recorrected records.

The process of passing control back and forth between the SMKC 52 and the sorting program 51 inherently imposes a substantial amount of overhead to monitor the status and effect the switching of control. Further, the SMKC program 52 appears to the user as an entity which is separate from the sorting program 51. This has required the development and provision of a separate set of supporting resources to familiarize and train the user in the use of each program. One will appreciate that such resources will proliferate with each non-EBCDIC sorting program developed to operate with the basic sorting program 51.

Finally, as will be appreciated from the use of the SMKC 52 or from FIG. 2, input and output processing is not performed by the sorting program 51, but rather by the calling program 52. The prior art SMKC 52 uses either the basic sequential access method (BSAM) or the queued sequential access method (QSAM) for record input and output processing. As is known, these I/O utilities are slower in operation than the I/O facilities of sorting programs such as the DFSORT release 8.0 referenced above.

Figure 4:
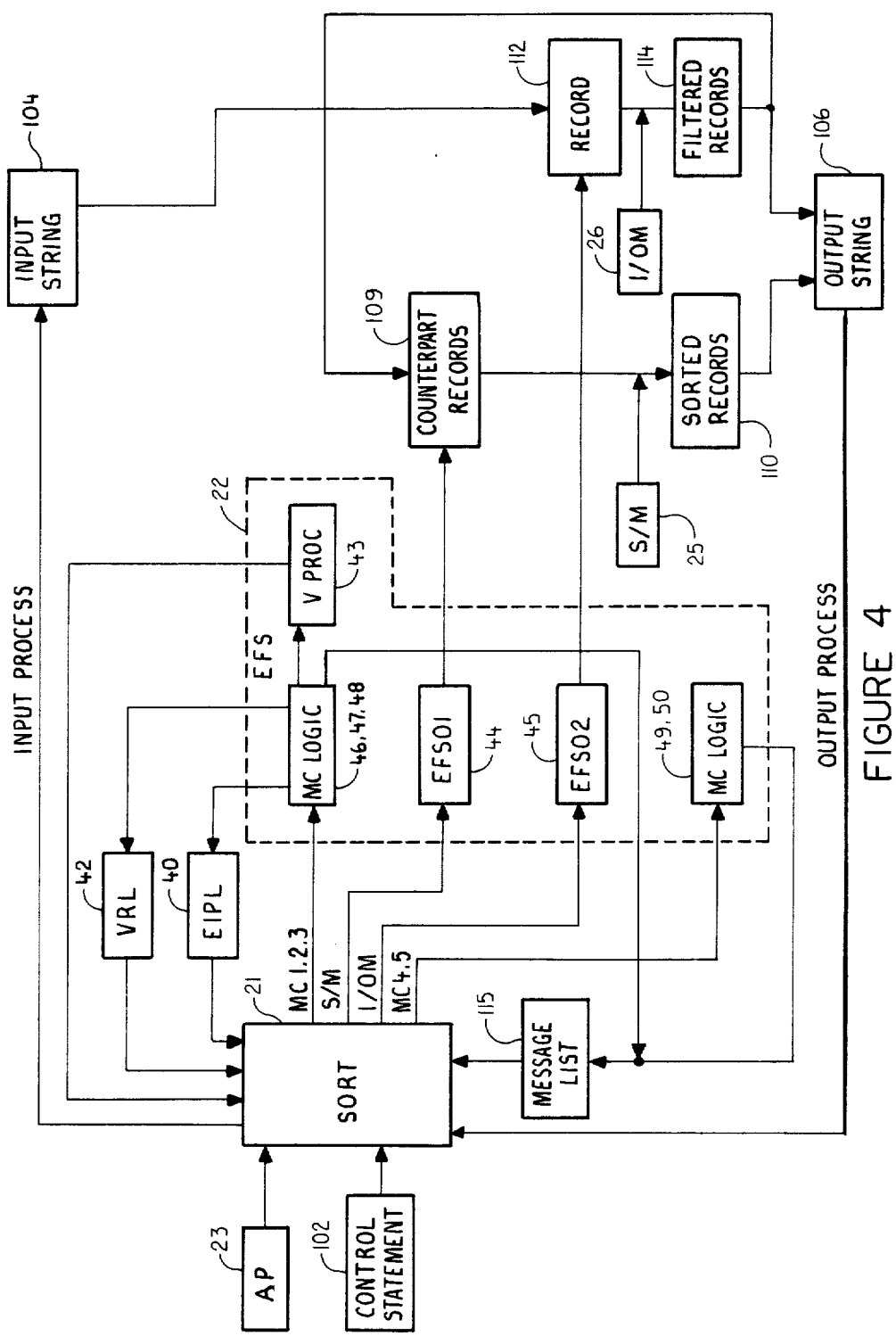
FIG. 4 is a schematic diagram illustrating the interface and flow of control between a sorting program and an extended function support program in accordance with the invention.

FIG. 4 illustrates a top-level view of the apparatus and method of the invention for extending the collating functions of a sorting program (SORT) 21 by provision of an extended function support program (EFS) 22. As in FIG. 2 and in the incorporated Archer et al. patent, SORT 21 can either be executed directly through the "PGM=" field of an EXEC control statement 102 in a job control program or invoked indirectly by an application program 23. In either case, the execution of SORT 21 is determined by control statements, also referred to as verbs. The particular type of operation conducted by SORT 21 on the input string 104 is indicated by a job control language (JCL) SORTIN control statement. The processed data is output in a file specified by a JCL SORTOUT control statement. Since the syntaxes of these two statements are well understood, no further explanation will be provided. The control statements which determine the operation conducted by DFSORT are also well understood. Among them are the statements or verbs SORT, MERGE, INCLUDE, and OMIT.

The SORT control statement provides information to SORT 21 about input record control fields wherein are contained the collating characteristics of the records. The statement has the syntax "SORT FIELDS=(p, m, f, s , ... , p, m, f, s)". The "FIELDS=" parameters describe the control fields in each record which contain he collating characteristics recognized in and responded to by the SORT operation. These parameters include p, which indicates the position within a record of a field, m, which indicates the length of the field, f, which signifies the format of the collating characteristic in the defined control field, and s, which specifies how the control field is to be ordered. Conventionally, the collating characteristics can comprise EBCDIC, ISCII, or ASCII-type characters or numerals in decimal or binary format. In the practice of the invention, the format can also have the value D1, indicating a user-defined data type requiring a call to the EFS program.

The syntax of the MERGE statement is essentially that of the SORT control statement, with the exception that the operation is denoted as MERGE. The "FIELDS=" parameters of the MERGE statement have the same format as those of the SORT statement.

The formats of the INCLUDE and OMIT statements are equivalent. As an example, for the INCLUDE statement the syntaxes "INCLUDE COND=" (p1, m1, f1, [EQ or NE or GT or GE or LT or LE], [p2, m2, f2 or constant][, [AND or OR]. . . )." The parameters p, m and f describe record condition fields. The field described by p1, m1 is referred to as the left-hand condition field, while the field specified by p2, m2 is the right-hand condition field. Record condition fields are the fields in records which are to be compared by the conditional operator EQ, NE, GT, GE, LT, or LE, to determine whether a record is to be included or omitted in an output file. The f parameter specifies the collating characteristics of the data in the condition fields in the same manner as the SORT and MERGE statements. In the invention, the FORMAT parameter (f) can also have the value D2, when the records comprise a user-defined data type requiring the EFS program.

The process interconnection of FIG. 4 will now be described. SORT 21 is either invoked by an application 23 or executed as a cataloged procedure called by the EXEC statement of a job control language procedure. In this regard, the syntax of the EXEC statement for invoking the sorting program 21 and the EFS program 22 is "//stepname" EXEC (PGM=SORT) or (PROC=SORT) or (SORT) [, PARM='EFS-=EFSPGM']". This syntax is well known for executing cataloged procedures on virtually all IBM CPU's extending back to the IBM System/360. In this regard, the EXEC statement invokes SORT 21 by its catalog name (SORT in this example) and specifies that the sorting program 21 is to exchange control with the EFS program 22.

When invoked from an application program written in Assembler, PL/I, or COBOL using conventional methods, SORT 21 is invoked dynamically by a LINK command designating SORT as the invoked program. In this case, EFS 22 would be invoked by means of the well-known OPTION control statement by the form "OPTION EFS=EFSPGRM."

When executing, SORT 21 executes concurrently with EFS 22, exchanging control by way of major calls 1-5 and exits 44 and 45. The exchange of control is supported by posting control and status information in the EIPL 40. Initially, SORT 21 is invoked and begins execution by processing the control statements and options, opening appropriate data sets, and obtaining storage necessary for execution. In the initial phase of execution, SORT 21 executes major calls 1-3 to obtain a verb request list 42, scan it, and pass the EFS program 22 control statements contained in the VRL 42. The VRL 42 is a list of control statements to be examined, altered, or ignored by EFS 22 before they are processed by SORT 21. EFS 22 responds to major calls 1-3 through the logic of major call modules 46, 47, 48, which pass the VRL 42 and initially receive regulated control statements. Control statements in the VRL 42 that are sent by the sorting program 21 to EFS 22 are submitted by EFS major call logic to the verb processing module 43 for alteration. The VPROC 43 modifies the control statements into a form executable by SORT 21, and the EFS major call logic passes the modified statements back to the program 21. Once the control statement processing is completed, SORT 21 begins to order an input record string 104 into sequences and to perform INCLUDE or OMIT logic on the elements in the string. If a SORT or MERGE is required, SORT 21 performs an extraction process on the elements of the string to create internal data elements which are used to SORT or MERGE the input string into one or more sequences. During this phase, the EFS01 exit 44 is called to supplement the extraction process by translating data in control fields containing collating characteristics foreign to the sorting program into collating characteristics recognized by SORT 21. Hereinafter, control fields containing collating characteristics recognized and translated by the EFS are referred to as "EFS control fields", and the untranslated data as "EFS characteristics". The translated collating characteristics form the internal counterpart records 109 used by the SORT-/MERGE module 25 of SORT to produce the sorted strings of records 110. If INCLUDE/OMIT processing is required to be performed on records with condition fields containing data to be translated ("EFS condition fields"), the second exit EFS02 45 is called to perform the condition analysis on the EFS condition fields of records 112 included in the input string 104 and to pass the result of the analysis to the INCLUDE/OMIT logic 26. The INCLUDE/OMIT logic 26 takes the appropriate action against the records based upon the result of the condition analysis performed by EFS02, thereby producing the set or string of filtered records 114. Once the collation processing is completed, SORT 21 processes the sorted records 110 and/or filtered records 114, deletes the internal records used by the S/M module 25, and performs the output string processing. The execution of SORT 21 terminates when the program closes data sets, releases storage, and returns control to the calling program or system. EFS 22 is involved in the termination phase by major calls 4 and 5 which activate major call logics 49, 50 to pass a message list 115 and to provide EFS 22 with the opportunity to undertake any further termination processing including closing data sets and releasing storage. The message list 115 provides a communication facility to the user via SORT 21; it can be passed by any of the major calls to communicate worthy information to the user.

Figure 5:
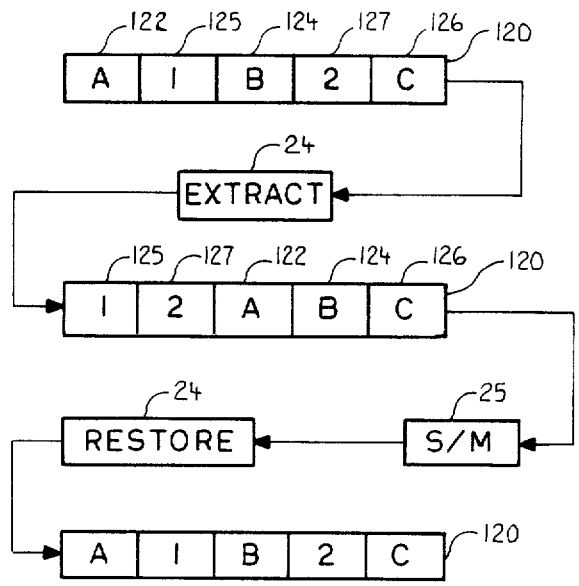
FIG. 5 is a schematic diagram illustrating an extract procedure performed by the sorting program of FIG. 4 during input processing of data elements.

Refer now to FIG. 5 for an understanding of the extraction/restoration process employed by SORT 21 to create internal records to assist the sorting/merging of input strings. An input data record 120 has a plurality of fields of which 122, 124, and 126 are not control fields, while fields 125 and 127 are control fields. In the prior art, the extract process module 24 operates on the record 120 to rearrange the fields of the record 120 by extracting the control fields 125 and 127, compressing the non-Control fields 122, 124, and 126 together, and appending the control fields 125 and 127 to the compressed record. The control fields 125 and 127 are appended as a "control word" by way of an extract buffer provided at the front of a copy of the record 120 placed in the extract buffer area, with the control fields being ordered according to their significance. The extract process 24 determines the starting locations in the extract buffer for the control fields in ascending order of significance. The records then are operated on by the SORT/MERGE module 25, which uses the extracted control fields to sequence the records. When the SORT/MERGE process is completed, a RESTORE function of the extract module is used to restore the records to their original format.

Figure 6:
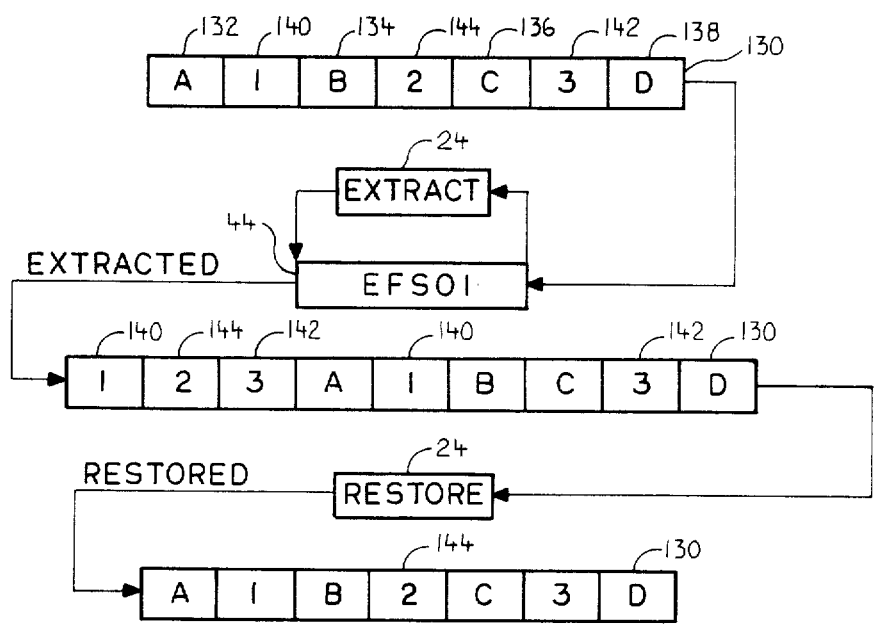
FIG. 6 is a schematic diagram illustrating how the extract process of FIG. 5 is modified for the practice of the invention.

FIG. 6 illustrates how the extract processing of FIG. 5 is adapted for the practice of the invention. Prior to processing records, the extract process 24 will build an extract buffer offset list for use by EFS 22 in extract processing. The list indicates the extract buffer offset locations where EFS control fields are to be located after translation. In FIG. 5, a record 130 includes fields 132, 134, 136, and 138 which are not used for sorting and also includes control fields 140, 142, and 144. It is asserted that control fields 140 and 142 are EFS control fields which are recognized and translated by EFS 22. It is further postulated that the control field 144 is a "non-EFS" control field containing collating characteristics recognized by SORT 21. In the extract process, a call loop is performed for each record. The loop consists first of copying the record to the extract buffer area and then invoking the EFS01 exit 44 and then the extract process 24. For each record, the EFS01 exit translates the collating values in the EFS control fields 140 and 142 (indicated by 1' and 3' in FIG. 6) and places the translated fields 140' and 142' in the extract buffer at the locations indicated by the extract buffer offset chain. The untranslated EFS control fields are left in the record 130 at their original locations. The extract routine 24 then extracts the non-EFS control field 144 and places it at its proper position in the extract buffer. After performing the SORT/MERGE function, the RESTORE function of the extract module 24 reinserts the non-EFS control field 144 at its original location, thus restoring the record 130 to its original form. It should be evident that leaving the EFS control fields 140 and 142 in the record eliminates the need to retranslate from non-EFS collating characteristics to EFS collating characteristics.

Figure 7:
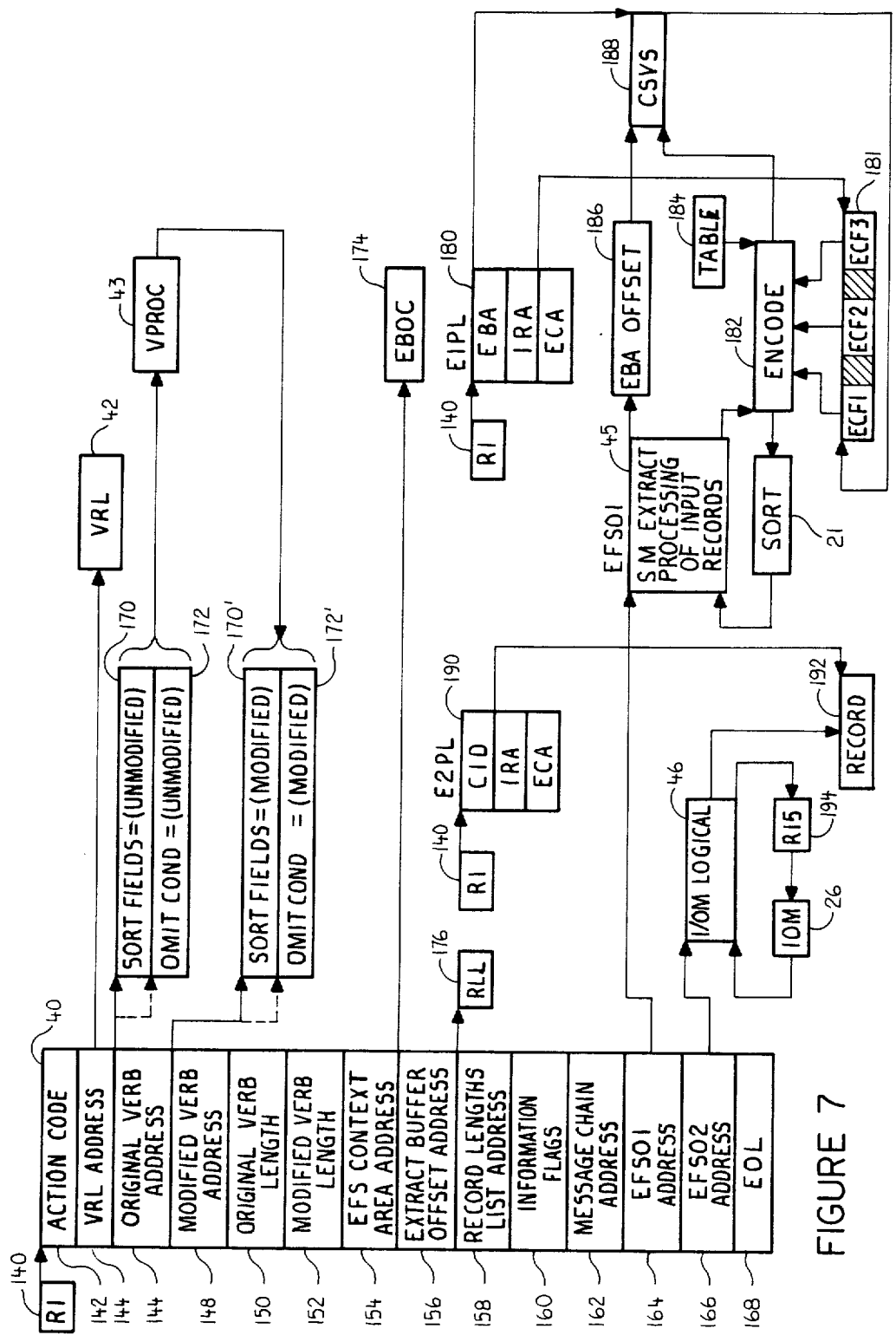
FIG. 7 is a detailed schematic diagram illustrating the control blocks, routines, and data areas defining the interface between the sorting program and the extended function support program of FIG. 4.

Referring now to FIG. 7, a more detailed description will be given of the control structures implementing the interfaces between SORT 21 and EFS 22. This detailed description assumes that input records including Japanese-language control and condition fields are to be processed by SORT 21. However, it is to be understood that the invention can be abstracted and applied to instances wherein the SORT program 21 is called to process records having other non-EBCDIC/ASCII characteristics.

In summary, the sorting program interface to EFS 22 supports at least three principal functions for users of the sorting program at execution time. First, a user may employ the interface to examine, alter, or ignore control statements or "EXEC PARM" options whether or not they are executable by the sorting program. The interface enables the user to supply customized control statements to SORT. The EFS routines can examine, change, or ignore control statements. Thus, the EFS interface permits a user to define new types of operations, define extended field parameters, alter options in effect, and perform other user-defined functions.

Second, the interface effects sorting or merging of user-defined data types with user-defined collating sequences. The extract function performed by the sorting program to create an internal record used in the SORT or MERGE process can be augmented through the use of the EFS program, thus providing the flexibility to define collating sequences beyond the single byte character set definitions of standard EBCDIC and ASCII. Further, new collating characteristics other than standard EBCDIC and ASCII can be defined.

Third, the interface supports the provision of logic to INCLUDE or OMIT records based on user-defined collating characteristics. Thus the user enjoys the ability to provide the INCLUDE/OMIT functions for user-defined collating characteristics or data types beyond the single byte character set definitions of standard EBCDIC and ASCII.

SORT 21, once invoked, sets register R1 140 to point to the location in virtual storage containing the EFS interface parameter list (EIPL) 40. The contents of the EIPL are indicated in FIG. 7 and include an action code 142, VRL address 144, an original verb address 146, modified verb address 148, original verb length 150, modified verb length 152, the EFS context area address 154, the extract buffer offsets address 156, a record lengths list address 158, information flags 160, a message chain address 162, and the addresses for EFS01 and EFS02, 164 and 166, respectively. An end of the list (EOL) terminator terminates the list at 168.

The EIPL 40 is used to communicate control and status information between SORT 21 and EFS 22, with list elements 142-166 being zeroed initially by SORT 21. The location of the EIPL 40 is stored and held in the register R1 140 whenever a call is made or an exit taken. The action code 142 is set by SORT 21 to indicate which major call is in effect. The address of the VRL 144 is set by EFS 22. The verb request list describes the control statements and the EXEC control statement PARM options which are to be sent to EFS 22 by SORT 21. The list includes only control statement operation definers, for example, SORT, MERGE, INCLUDE, OMIT and EXEC PARM option names. The verb request list 42 is in conventional linked-list format.

SORT 21 compares the entries in the VRL 42 against the control statements provided from its invoking source. When a control statement or an EXEC PARM option has an operation definer contained in the VRL 42, SORT 21 places a copy of the control statement or the EXEC PARM option string in a storage area and places the storage area address in field 146 of the EIPL. The control statements and options addressed by field 146 are processed by the VPROC 43 of EFS 22.

It will be evident that the practitioner Will be able to compile a VRL including virtually any sorting program control statement which defines, operates on, or affects record control or condition fields containing collating characteristics. In this regard, it has already been specified that the minimum complement of VRL would include control statements defining operations including SORT, MERGE, INCLUDE, and OMIT. The practice of the invention contemplates that certain of the "FIELDS=" and "COND=" parameters of these statements will be unintelligible to the sorting program until modified by VPROC 43. In the preferred embodiment, it is also contemplated that VRL will list control statements that are not intended to be executed by the sorting program 21, but which are provided to pass processing information to the EFS program. For example, in the case where the EFS program would be used to sort Japanese-language records, a control statement of the form "KJS [CHECK=k][, (CSES=nnn or CSTS=nn)][, (CSER=mmm or CSTR=mm)][, DYT=pp]" may be received by SORT 21. As will be appreciated by those aware of the prior art, the syntax of this control statement is the same as the identical statement of SMKC 52 of FIG. 2. This control statement is provided to enable the user to select and invoke the translation tables and encoding procedures for a particular Japanese-language sequence. In the prior art KJS control statement, the CHECK field specifies the process option in the event that an invalid Kanji code is found in input data records. The CSES and CSTS fields identify a respective stroke-count encode table, while the CSER and CSTR fields represent alternate radical stroke-count tables. The DYT field signifies a representative pronunciation encoding table.

The processing of a KJS-type control statement by EFS 22 involves identifying for the exits EFS01 and/or EFS02 the translation tables and routines to be used in translating the Kanji collating characteristics in the EFS control or condition fields of input records. The KJS-type control statement is ignored by SORT 21 during its verb parsing process, which follows the modification of control statements by VPROC 43.

A pair of unmodified control statements 170 and 172 are illustrated in FIG. 7 as being passed to VPRoC 43, which modifies them to 170' and 172', respectively. The verbs are modified to a form recognized and executable by SORT 21. In this regard, see FIGS. 9 and 10.

Figure 9:
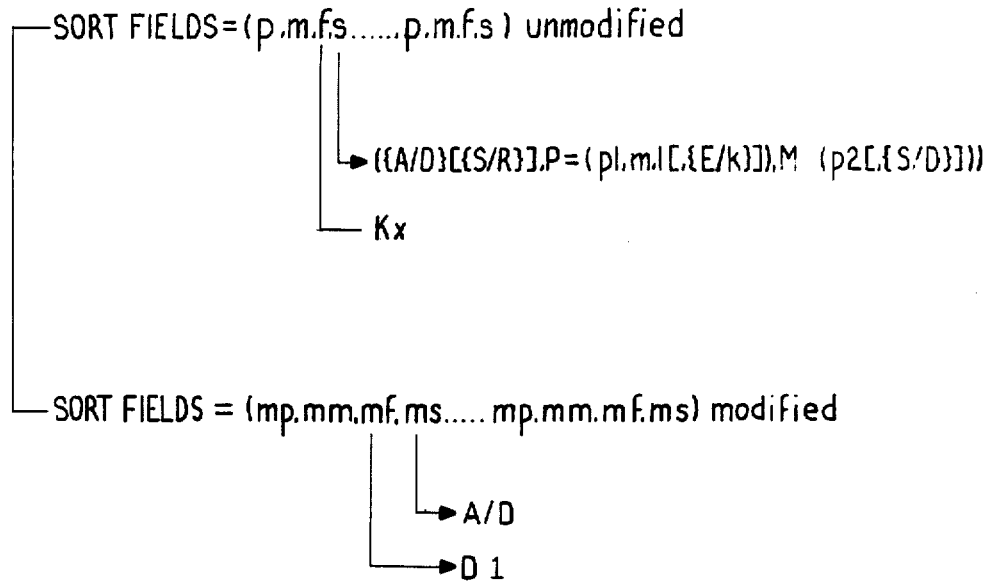
FIGS. 9 and 10 illustrate the modification of SORT/MERGE and INCLUDE/OMIT control statements, respectively.

As illustrated in FIG. 9, the "FIELDS=" parameters of the SORT/MERGE verbs are modified. In the Japanese-language sorting example, the unmodified form of the FIELDS parameters includes p signifying the starting position of an EFS control field in Japanese-language records to be sorted, m specifies the length of the EFS control field, while f specifies the ordering type selected by the user. Relatedly, in Japanese-language sorting the ordering types are signified by KS, KR, KO, KI, KE and KP. These ordering sequences can be well understood by reference to the IBM publication no. SH18-0016-0, cited above. The s parameter specifies sub-ordering type, pronunciation control field information indicated by "P=", and mapping field information "M=". Again, this syntax is available in the prior art IBM publication. As is known, an unmodified SORT statement of the form illustrated in FIG. 9 is executable by the prior art SMKC against input strings of Japanese-language records. The unmodified SORT verb, however, is neither recognized, nor executable, by SORT 21. The VPROC 42 modifies the "FIELDS=" parameters to a form recognized by SORT, thereby rendering the verb into a form executable by the program. In the modified form of the verb, the p and m parameters are put in binary form, the f parameter is altered to D1 signalling SORT that records include EFS control fields, while the s parameter signifies that sorting or merging is to advance according to an ascending (A) or descending (D) sequence.

Figure 10:
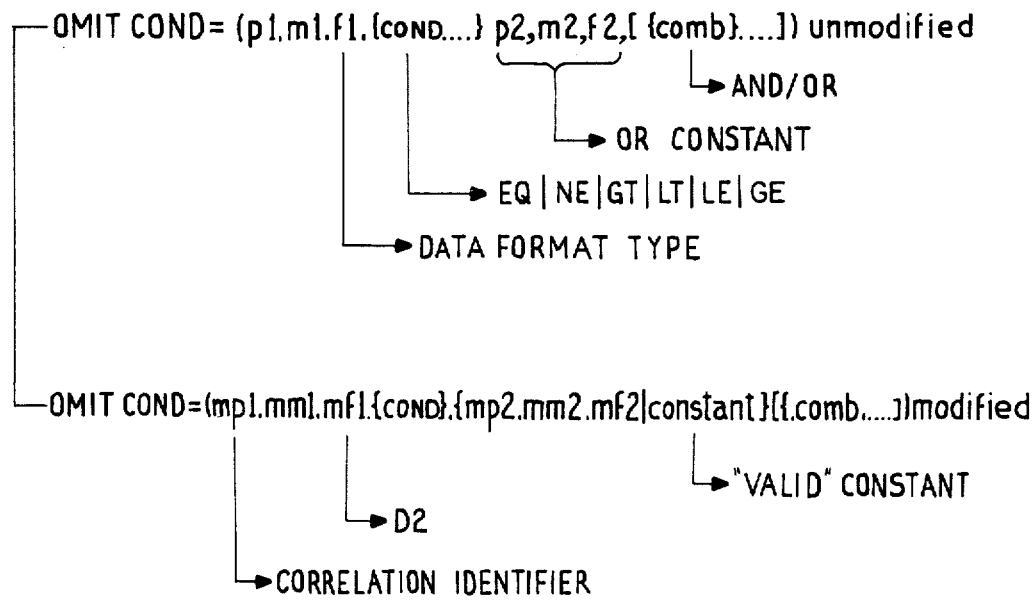

Continuing with the Japanese-language example and referring to FIG. 10, modification of the "COND=" parameters of INCLUDE/OMIT verbs results in changing the p and f parameters and converting into binary form. The syntax of the unmodified COND parameters of an OMIT verb that is recognized by the EFS program 22 includes parameters p1 and p2 specifying the starting position of the condition fields to be compared, m1, m2 specifying the length of the condition fields, and f1, f2 indicating the format of the data in the fields. In the Japanese-language example, the f parameter is denoted as DBCS or PR. The DBCS value specifies that the field includes a Japanese-language character in double-byte form which is to be compared without encoding; PR specifies that the double-byte character is to be compared with the character in the other field based upon a pronunciation sequence. A comparison operator (COMP) separates the two condition fields to be compared, while a combination operator (COMB) indicates whether the result of the comparison is to be combined with the result of a second comparison of two other condition fields. For the unmodified verb of FIG. 10, the data in condition field 1 (p1, m1) is compared against the data in condition field 2 (p2, m2) according to the comparison operator specified by the COMP parameter, with the outcome of the comparison determining whether the record is omitted from the output list or not. As with "COND=" parameters of prior art INCLUDE/OMIT statements, the second field (p2, m2, f2) can be replaced by a constant. In its modified form, the OMIT statement of FIG. 10 includes "COND=" parameter mp, a correlation identifier identifying an entry in a correlation sequence which places p1, p2 at a sequence location corresponding to the correlation sequence position occupied by the correlation operation to which they are to be subjected. The f parameter is modified to D2, indicating to SORT that records to be filtered include EFS condition fields. If a constant is the second condition field, it is modified to a "valid" form recognizable during SORT parsing.

Returning to the description of EIPL 40, the original and modified verb length fields 150 and 152 indicate the length of the respective verb forms.

The EFS program context area indicated by field 154 provides a private communication facility for use by the EFS program as appropriate. The EFS program obtains and releases the necessary storage for the context area.

The extract buffer offsets list address in 156 points, for each record, to the linked list of offsets into the extract buffer that is passed to the EFS program 22. The offsets show the starting positions in the buffer area where any translated EFS control fields specified on the SORT or MERGE FIELDS operand are to be placed. The offsets are provided in the same order as specified for EFS control fields in the "FIELDS=" operand.

The records length list 176 is addressed in the field 158. The list is provided to enable SORT 21 to pass information concerning input and output record lengths to EFS 2.

Figure 8:
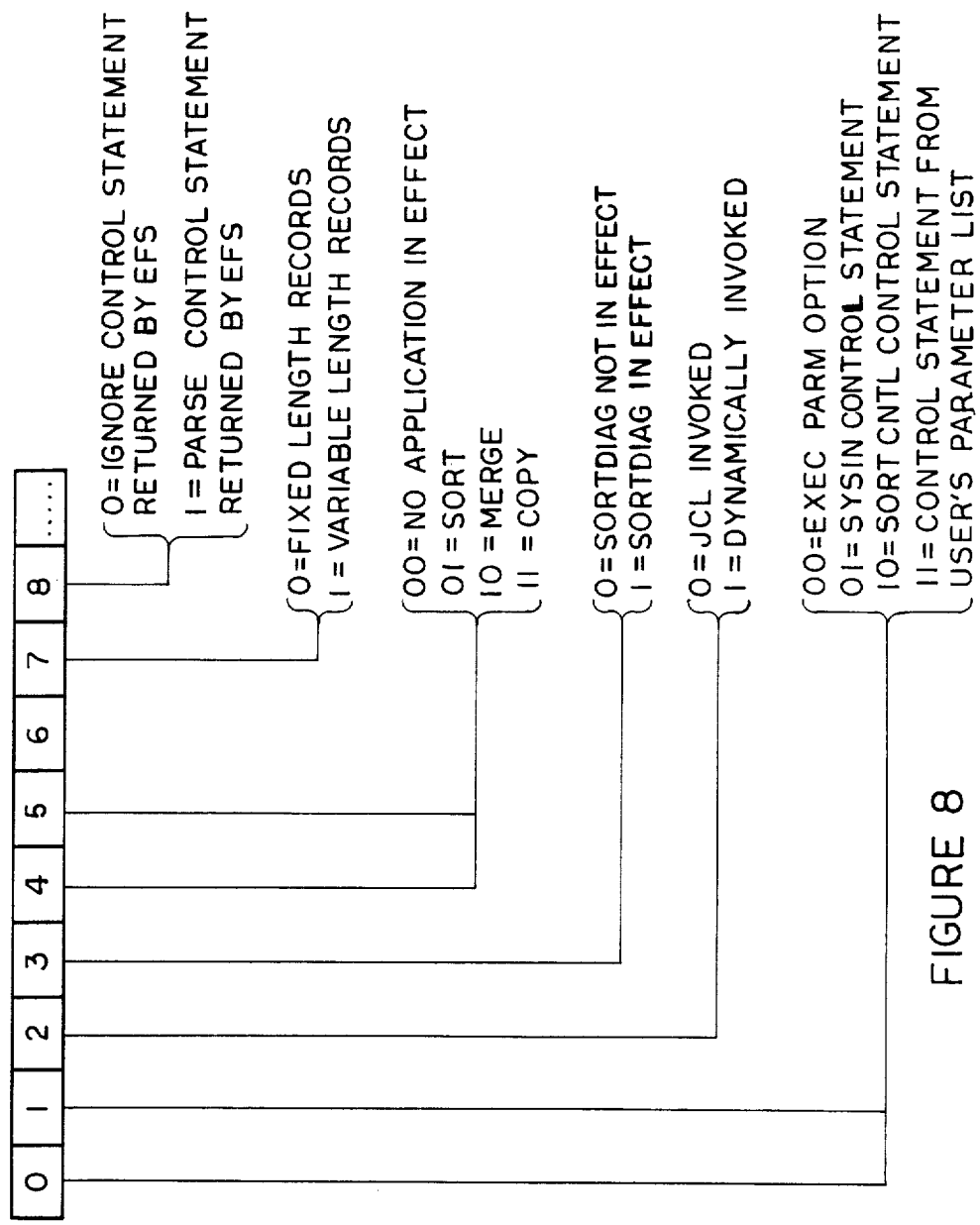
FIG. 8 is a schematic diagram illustrating the structure of the information flags contained in the extended interface parameter list of FIG. 7.

Field 160 of the EIPL 40 is a control data element consisting of a sequence of information flags, each consisting of a single bit. These information flags are the primary conveyors of status when control is transferred between SORT 21 and EFS 22. As illustrated in FIG. 8, bits 0 and 1 indicate the source of the control statement being processed. Bit 2 indicates how the sorting program was invoked. The third bit flag indicates whether diagnostic messages are to be printed. Bit flags 4 and 5 indicate the sorting function which is being executed Bit flag 7 indicates whether records have fixed or variable lengths, while bit flag 8 is set by EFS 22 to inform the sorting program 21 whether or not to parse the control statement being returned by EFS. Thus, for example, once EFS 22 inspects and parses the KJS control statement described above, it will set bit flag 8 to zero, which will cause the sorting program 21 to ignore the control statement. However, when modified SORT-/MERGE or INCLUDE/OMIT control statements are returned, bit flag 8 is set to 1.

EIPL field 162 provides EFS 22 with the ability to return informational or critical messages for output through a message facility in SORT 21 which corresponds essentially to the message facility of DFSORT release 8.0. This interface permits EFS 22 to pass information to the user regarding program status, conditions, or errors. EFS links its message to the message chain addressed in field 162. The messages in the chain are output by the termination activities of SORT 21.

The addresses of the EFS exits—EFS01 and EFS02—are entered by EFS into fields 164 and 166, respectively, of the EIPL 40. Whenever the D1 format is returned in the "FIELDS=" operand of a modified SORT/MERGE statement, SORT 21 will call exit routine EFS01 to process the EFS control fields in the records. When the D2 format is returned in the "COND=" field of a modified INCLUDE/OMIT control statement, SORT 21 will call EFS02 to process EFS condition fields.

Exit EFS01 is essentially an extract routine which operates as illustrated in FIG. 6 to translate the EFS control fields of input records and relocate the translated field to the front of the records.

When it calls EFS01 45, the sorting program 21 provides the address of a parameter list (EIPL) 180 in the register 140. EIPL 180 contains three words: the address of the extract buffer area (EBA), the address of the input record to be processed (IRA), and the address of the EFS program context area (ECA). ECA contains addresses of various control structures required by the EFS exit routines to process control and condition fields. When called, EFS01 encodes the EFS control fields (ECF) of the addressed input record 181 using at least one encoding routine 182 and at least one translation table 184. The encoded EFS control fields are then appended to the copy of the record in the extract buffer at locations determined by combining the extract buffer address in the parameter list 180 with the appropriate offsets in the extract buffer offset chain 144. Control is then returned to the sorting program 21 to perform any non-EFS control field extraction that may be required. When the translating and extraction process is completed, the result is a correlating sequence value string (CSVS) in the extract buffer area 188 appended to the copy of the record 181 in the extract buffer area. The CSVS consists of the translated EFS control fields and the untranslated non-EFS control fields.

When EFS02 46 is called, the sorting program 21 passes the address of a parameter list (E2PL) 190 in the register 140. The parameter list 190 contains three words: the value of the correlator identifier (CID), the address of the input record (IRA), and the address of the EFS program context area (ECA). EFS02 is called to perform the INCLUDE or OMIT comparison logic for each relational condition containing an EFS condition field. EFS02 is called for each input record according to the evaluation defined by the combination operator (that is, AND, OR, and/or parenthesis). EFS02 uses the correlator identifier to determine the current EFS relational condition being performed and then performs the comparison logic for that EFS relational condition. For a single record, EFS02 may be called as many times as are required by AND or OR operators and/or parenthesis in the "COND=" operand. Each time it performs a conditional relation evaluation on EFS condition fields, the outcome is returned to the IOM module 26 of the sorting program in register R15 194.

Referring now to FIG. 11 and Tables I–IX, a description will be given of the method of the invention for extending the functions of SORT 21. In step 200, SORT 21 is invoked, either by a JCL SYSIN control statement or an EXEC PARM option. SORT 21 may also be dynamically invoked by an application program control statement. In the explanation which follows, Tables I and II will be referred to extensively. Table I provides an example of invocation of SORT 21 and EFS 22 by a JCL program. Table II is representative of invocation of SORT 21 and EFS 22 through an application program. After being invoked, SORT initializes itself in step 202 by acquiring storage and establishing preliminary linkages. In Tables I and II, the OMIT statements include the "<" (less than) and ">" (greater than) characters, which signify "shift-out" (X 'φE') and "shift-in" (X 'φF') characters.

When initialized, SORT searches EXEC and control statements first in decision 204 for a keyword indicating that EFS processing is in effect. If a keyword is found, the sorting program in steps 206 and 208 sets a flag to indicate that EFS processing is in effect and saves the EFS program name supplied with the EFS keyword. To find a keyword, SORT 21 inspects the control statements input through the invoking program. In Table I, the keyword, 'EFS=AKSLKJST . . .' is found in the "PARM=" field of the EXEC statement. In Table II, the same keyword is found in the OPTION statement of the control statement string. After steps 206 and 208, SORT performs major call 1 processing in step 210.

Refer now to Table III for an understanding of major call 1 processing. Prior to making the call, SORT sets the action code field 142 of the EIPL 40 to zero indicating major call 1 to the EFS program. This code requests EFS to return the VRL 42 and the address to the EFS context area. In addition, bit 2 of the EIPL information flag field 160 is set to indicate the method of invocation; bit flag 3 is set to indicate whether a SORTDIAG JCL statement is detected. EFS is then called. The outcome of the call is indicated by EFS entering a return code Value into register 15 (R15). Thus, at the return from EFS, SORT in step 212 inspects the contents of R15. If a return code other than zero is detected in decision 214, SORT invokes a termination or error processing routine to terminate its execution. A return code of zero, however, indicates successful execution of the call by EFS and permits SORT to continue processing. (It will be understood in the discussion below concerning major calls 2–5 that steps 212–216 are part of each major call procedure.) When control is returned from EFS, SORT processes the information returned by EFS through the EIPL 40, saves the context area address passed in field 154 of the EIPL, and then inspects EIPL field 144 to determine whether the address of the VRL 42 has been passed. If no address is found, the EFS flag set in step 206 is turned off. Otherwise, in step 218, the sorting program obtains the address of the VRL 42.

In step 220, SORT parses the control statements (verbs) and processes those control statements whose operation definers are not found in the VRL. For JCL-invoked processing, the sorting program in step 222 saves all JCL EXEC options requested by the EFS program by way of the VRL; thus, in Table I, the "PARM=" field of the EXEC statement is saved at an addressable location. Next, SYSIN data set control statements are processed. In Table 1, the SORT and OMIT control statements are saved for major call 2 processing prior to parsing of those verbs by SORT221.

Referring to Table II, the OPTION control statement ending the listing, as well as the SORT, OMIT, and OPTION control statements in the 31-bit parameter list beginning at CTLSTART in Table II, are saved.

At major call 2, step 226 of FIG. 11, the sorting program uses the logic of Table IV to send the verbs saved in step 224 one-by-one to EFS for processing. In this regard, an action code of 4, denoting major call 2, is entered into EIPL field 142. This code informs EFS that a verb string is being sent by SORT. The address and length of the verb being sent are entered into EIPL fields 146 and 150, respectively. A code indicating the type of control statement is entered into information flag bits 0 and 1, while bits 4 and 5 of the information flags are set to indicate the type of sorting program processing in effect. EFS is then called and, when the call is returned, the contents of register R 15 are inspected. When the call is returned, SORT first inspects information bit flag 8 to determine whether the control statement returned by EFS is to be parsed or ignored. In step 228, the returned verb is parsed or not according to bit flag 8, and major call 2 is made again if any VRL-indicated control statements remain to be processed.

In step 230, the sorting program 21 generates code for execution of INCLUDE/OMIT processing, if necessary. The INCLUDE/OMIT code generation is illustrated in Table V. Appropriate inclusion or omission code is generated according to the data in the "CON="

field of any INCLUDE or OMIT statements contained in the invoking program. Thus in the examples of Tables I and II, the "COND=" field of the OMIT statements stimulates code generation according to Table V. In Tables I and II, the PRD field and G constant will have been modified during major call 2 by VPROC 43 in EFS (as described below) to D2 and a "valid" constant, while the mp field value of 4 will have been changed to the correlator identifier 1. For EFS-modified "COND=" fields, the INCLUDE/OMIT logic of Table V generates, at step 230, a set of code to call the EFS02 exit routine for each EFS field. The Table V logic then generates the EFS02 calling code, reserves storage area for the E2PL 190 and enters the correlator identifier and EFS context area into the E2PL.

In steps 232 and 234, the record lengths list and extract buffer offset chain are built and their addresses entered into EIPL fields 158 and 156, respectively. Into the record lengths list are entered the input record length and output record length values for the records to be processed in major call 3. The extract buffer offsets chain is built using the position and length of each field to be filled in the extract buffer for a record. Major call 3 processing is then performed in step 236.

Major call 3, illustrated in Table VI, is used to support the sorting or merging of records with EFS-recognized collating characteristics into EFS-defined collating sequences using the EFS01 exit. Major call 3 also provides logic to INCLUDE or OMIT records with EFS-recognized collating characteristics using the EFS02 exit. In preparation for the call, SORT sets the EIPL field 142 to 8, denoting major call 3, and sets the addresses to the record lengths list and extract buffer offsets in the appropriate EIPL fields. SORT then flags the type of application in effect and the type of records being processed by setting bits 4 and 5 and bit 7, respectively, of the information flags in EIPL field 160. Major call 3 is executed and SORT 21 saves the returned EFS01/EFS02 address or addresses.

The examples of Tables I and II include both a SORT and OMIT statement, each to be executed on EFS-recognized records. In this case, the SORT and OMIT-RECORD processing are executed sequentially, with the OMIT-RECORD processing coming first.

Prior to the OMIT-RECORD processing, SORT 21 prepares for SORT-RECORD processing by generating SORT/MERGE code in step 238 appropriate for calling EFS01 during processing of the input records.

As illustrated in Table VII, SORT/MERGE code generation consists of generation of code call EFS01, reservation of EIPL, and storage of the EFS context area in the appropriate field of EIPL. Code is also generated to perform the extraction process for record control fields containing collating characteristics recognized by the sorting program.

Next, the INCLUDE/OMIT logic generated for execution of INCLUDE/OMIT processing is operated in step 240 when records with EFS condition fields are processed in this step. Referring to the "COND=" field of the modified verb, the logic generates a call to EFS02 for each relational condition involving EFS condition fields, the call being made as needed for the sequence of correlator identifiers in the control statement until the combinatorial expression defined by the AND, OR, and/or parenthesis in the control statement is solved for the condition fields of the record being processed. The processing is illustrated in Table VIII and consists of processing the EFS and non-EFS condition fields of the record in the order defined by the combinatorial expression in the controlling verb. For the particular verb, the EFS02 exit routine call generated in step 230 and the E2PL built in the same step are used, E2PL is initialized by inserting the input record address (IRA) and EFS02 is called. EFS02 performs the INCLUDE/OMIT processing required in response to the verb operation field and the correlator identifier. The outcome of the conditional operation is entered into register R 15 as illustrated in Table VIII and SORT appropriately includes or omits the record according to the contents of the register.

When all of the input records have been processed by the loop comprising step 240 and the EFS02 exit 46, the sorting program 21 begins the extract process on the input records filtered by the loop 240/46. First, the EFS01 exit 44 is summoned and EFS01 processing according to Table IX is performed. The EIPL 180 is initialized by inserting the address of the current input record (IRA) into the list, inserting the address to the extract buffer area into the list, and then calling EFS01. The return from EFS01 is in register R 15, with zero indicating successful completion of the EFS extraction on the record. When all of the filtered input records have had their EFS control fields extracted, the sorting program 21 performs conventional extract processing on the extracted record fields in step 242 and then conducts the appropriate SORT/MERGE processing in step 246. The sorted/merged records are restored in step 248 by reinsertion of their non-EFS control fields as discussed above.

The sorting program terminates operations by executing major calls 4 and 5 in step 250. Major call 4 processing is used to provide any EFS messages to the sorting program for printing to the message data set, while major call 5 provides the EFS program the opportunity to do termination processing. At the completion of major call 5, the sorting program outputs the collated list as SORTOUT (step 251), terminates, and returns control to the operating system OS 18.

Refer now to FIG. 12 for an understanding of the method of the invention from the point of view of EFS 22. EFS extends essentially to an initializing step 280, a step 282 in which a call is received from SORT 21, a step 284 where EFS saves whatever parameter values are passed by SORT, a step 286 in which EFS calls an appropriate process module to perform the required function as indicated by the passed parameter values, a step 288 in which the output from the called module is moved to the appropriate field of the EIPL 40 and the return code is entered into register R 15, and finally a step 290, returning control to SORT 21. The modules called by EFS program step 286 include the modules 46–50 for executing processes appropriate for major calls 1, 2, 3, 4, and 5, respectively. Connectivity is also provided to verb (control statement) processing modules 321, 322, and 323, which collectively form VPROC and which perform verb processing procedures to parse and modify control statements forwarded to EFS 22 by SORT 21. The input to EFS is in the form of parameters passed via the EIPL from SORT 21. The (R)outputs are in or indicated by the EIPL 40 and the return code in register R 15. When invoked, EFS is conventionally initialized in step 280. When a call is received in step 282 from SORT, the EIPL action code field 142 is inspected to determine which major call module is to be summoned, the appropriate call procedures are undertaken in step 286, and the return processing is completed in steps 288 and 290.

The description will now be directed to data structures that are used to control the execution of EFS, and which are necessary to understand the order of procedures entailed in the sequential execution of modules 44-50. In this explanation, the terms "verb" and "control statement" will be used interchangeably. The control structures are illustrated in FIGS. 13 and 14 and include a table control block (TCB) 300, an encode module control block (MCB) 302, a control field control block (CFCB) 304, and a condition control block (CONDCB) 306. The TCB 300 is a control block which is used to save information regarding the translation tables to be used in translating the correlation characteristics of input records for the purpose of SORT/MERGE or INCLUDE/OMIT processing. The TCB 300 will have from 1 to N entries (TTI to TTN), each encompassing status and parameter information for a particular translation table. For example, TT1 will include information regarding the table type, the status of the table, its name, and address. The MCB 302 contains corresponding information for each encoding routine (ENCR) 1-L to be used in translating record collating characteristics. In this regard, the prior art SMKC employs a plurality of encoding routines, each using one or more translation tables to translate Japanese-language collating characteristics to ASCII or EBCDIC characteristics.

CFCB 304 is constructed to associate a SORT or ERGE verb modified to accommodate processing of records with EFS control fields with the encoding parameters for each record control field to be modified. For example, in translating the Japanese-language control fields of a record corresponding to that illustrated in FIG. 3, a control entity for each of the encoding steps is provided in the CFCB 304. In the CFCB 304 are a plurality of fields o sub-blocks which include a field 310 containing the address of the modified Verb (AMV), a field 312 containing work area parameters (WAP) for the required control field encoding, a field 313 containing the number of EFS control fields (NENT) to be translated), and a plurality of encode request sub-blocks (ERB) 314, each including parameters necessary for encoding a respective EFS control field of an input record. In this regard, the encode request sub-block ERBI includes a plurality of information fields 316, 318, 320, 322, and 324. A sorting type (ST) field 316 indicates the type of sequence ordering pertaining for the control field. For example, in the Japanese-language example, this field may indicate a Japanese syllabary ordering based upon total strokes in a character. An input data type (IDT) field 318 indicates the type of input data to be encountered in the EFS control field. The field 320 includes the address of the encode routine to be utilized in performing the translation procedure, while the field 322 contains the address of the translation table to be used by the encode routine addressed in field 320. The field 324 contains EFS control field parameters (CFP) pertaining to the control field to be translated. The parameters of interest are the offset to the beginning of the extract buffer field where the counterpart collating characteristic is to be placed, the offsets to the beginning of the original fields in the input record, the length of the field, and the type of untranslated data to be encountered in the original field.

A condition control block (CONDCB) 306 is built to associate a modified INCLUDE or OMIT verb which is to be used in filtration of input records with the condition fields of the records. The CONDCB 306 embraces a plurality of information fields and sub-blocks. The address of the modified INCLUDE or OMIT verb (AMV) is in field 330. Work area parameters (WAP) for condition field translation are in field 332, and the number of conditional field entries is in field 336; the magnitude of the entry in this field indicates how many correlation identifiers are in the modified verb, and thus indicates the number of conditional comparisons to be made on each record. Following the field 336 is a field of correlation control request blocks (CCRB), with the principal fields illustrated in the first CCRB, that is CCRBI Each CCRB consists of a field 338 into which is entered a correlation identifier, and a field 340 containing the comparison to be performed on the two condition fields linked by the CCRB. The control data necessary for translating the left and right condition fields, respectively, are found in encode request blocks (ERB) 342 and 344. It should be evident that the string of CCRBs in the CONDCB 306 will correspond to the number of conditional comparisons indicated by the modified verb and the logical sequence in which they are to be performed.

In FIG. 13, a detailed sequential process entailed in the partial execution of EFS 22 is illustrated. When major call 1 is made, EFS 22 calls its major call 1 module 44 to load the address of the VRL 42 into field 144 of the EIPL 40. Next, major call 1 logic 44 executes GETMAIN procedures to obtain the EFS context area and storage area for the TCB 300 and the MCB 302. Once the areas are obtained, the blocks are initialized. A message control block and message generation area (neither shown) are also built by the logic 44. The logic 44 places into the EFS context area the addresses of all of the blocks built in major call 1 and returns to the main EFS process, providing a return code in register R15. The main EFS process places EFS context area address into EIPL and returns to SORT.

Next, in response to major call 2 from SORT 21, EFS 22 calls the logic 47 for major call 2, which is illustrated in Table XI. Major call 2 logic 47 obtains the verb being returned by SORT 21, detects the keyword in the verb, and calls one of the VPROC modules 321-323 to process the verb. To execute these functions, major call 2 logic 47 initializes storage parameters for accommodating the modified form of the verb, sets a verb process option flag on and initializes resolution and composition tables used by the called verb processor to parse the verb being passed and to begin construction of the modified verb. The logic 47 initially parses the verb to detect the keyword and to separate the verb into constituent parts as illustrated by the example in FIG. 14.

In FIG. 14, a SORT verb 359 is initially parsed by major call 2 logic 47 and divided into constituent parts, with each part being entered into an appropriate field of a resolution table 360. After the verb is resolved by the logic 47, the logic 47 calls an appropriate verb processing module based upon the verb keyword (VERB). In FIG. 14, the keyword is SORT, resulting in the logic 47 calling the SORT/MERGE verb processor 322. The called verb processor uses the resolution table passed by the major call 2 logic 47 to parse the unmodified verb and to initialize composition of the modified form of the verb by way of a composition table 362 initialized by the logic 47.

The called verb processor (which may be any of VPROC I, S/M, or I/OM) also builds the appropriate control field or condition control block and the necessary encode request blocks for operating on the EFS control or condition fields of input records. The record field and coding modules and translation tables needed for translating the collating characteristics of input records are noted by entries into the MCB and TCB. The addresses of the control field and condition control blocks are placed in the EFS context area for reference later by major call 3, EFS01, and EFS02.

Continuing now with the discussion of major call 2 logic 47 as illustrated in FIG. 13 and Table XI, when the called verb processing module returns to the call logic 47, the logic 47 completes the composition of the modified verb based upon the initial entries made in the composition table by the called verb processing module. The module places the address and length of the modified verb into the EIPL, and returns to the main EFS process.

The verb processing modules are illustrated in Tables XII, XIII and XIV. When the KJS control statement is encountered by the call logic 47, the first verb processing module 321 is called. As illustrated in Table XII, this module functions primarily to process the KJS verb by determining which ordering sequence is indicated and making the appropriate entry into the table control block 300. When this process returns, the call logic 47 resets bit flag 8 in the EIPL information flag field 160.

The SORT/MERGE verb processor 322, illustrated in Table XIII, operates to initiate composition of a modified SORT/MERGE verb by referring to the resolution table and using the composition table constructed by major call 2 logic 47. In the process of analyzing the unmodified verb and composing the modified verb, the verb process module 322 is executed. In execution of the module 322, the "FIELDS=" operand of the verb is parsed, the composition table and control field control block are built, the syntax of the resolved verb is checked, and the appropriate entries are made into the TCB and MCB 300 and 302. As shown in Table XIII and in FIG. 14, the process of composing a modified verb in the verb processing module 322 includes converting the control field offsets and links to binary representations and requesting the appropriate translation tables and encoding modules. If the input records are to be ordered according to a syllabary or pronunciation sequence, additional control fields for pronunciation data and mapping data will be included in the records and indicated in "P" and "M" parameters of the unmodified verb. The verb processor 322 builds the appropriate encode request blocks for these control fields and modifies the parameter r®presentations in the "FIELDS=" of the modified verb, with the modification being included in the composition table. The verb process module 322 then returns to call 2 logic 47.

The INCLUDE/OMIT processing logic 323 (Table XIV) processes INCLUDE/OMIT verbs by referring to the resolution table passed by call 2 logic 47 and makes up the appropriate composition table and condition control block. The verb process 323 scans the whole "COND=" keyword value to count the number of correlation operations involving EFS condition fields, builds and fills the CONDCB, and scans the "COND=" keyword values of the unmodified verb to save the EFS condition information in the built condition control block. The verb processor 323 also converts condition field constants into an EBCDIC format recognized by SORT 21 in order to avoid an abnormal termination by SORT 21, based upon its detection in the modified verb of parameters not conforming to the standard syntax expected by the SORT program 21.

Returning to FIG. 13, when all of the verbs passed by SORT 21 have been processed through major call 2 logic 47, major call 3 is executed by SORT 21 to enable EFS 22 to initialize the translation tables and encoding routines necessary for extract processing to support SORT/MERGE operations. Call 3 logic 48 also loads the EFS01 and EFS02 modules 44 and 45 as required and places their address in the EIPL 40. Referring now to Table XV, call 3 logic 48 initializes by addressing the table, module, control field, and condition control blocks built previously. Next, logic 48 saves the extract buffer offsets into the appropriate encode request blocks of the control field control block and then obtains the necessary translation tables and encode routines indicated by TCB 300 and MCB 302. The logic 48 then completes the control field control block by moving to the encode request block for each EFS condition field to be translated the appropriate address for the translation table and encode routines to be used by EFS01 to construct the counterpart control information. Call 3 logic 48 also completes the encode request blocks in the condition field control block by inserting the appropriate translation table and encode routine addresses. After the loading the address of EFS01 44 and EFS02 45 into the EIPL, when needed, call logic 3 returns to the main EFS program 22.

Continuing With the sequence of FIG. 13, if INCLUDE/OMIT processing is to be performed on input records, EFS02 45 is summoned once for each correlator identifier encountered in a modified "COND=" field. If, in addition, SORT/MERGE processing is to be performed, EFS01 44 is called after EFS02 45.

Referring to Table XVI, EFS02 45 refers to E2PL and to the condition control block 306 to perform, on each record, the sequence of conditional comparisons established by the correlation control sub-block sequence in the condition control block 306. For each correlator identifier sent by SORT, EFS02 determines whether the INCLUDE/OMIT condition is true or false and sets the return code accordingly. The outcome of the conditional comparison is returned to SORT 21, with SORT 21 including or omitting the record according to the outcome of the comparison performed by EFS02 45. EFS02 45 performs the comparison by encoding the two EFS condition fields, comparing their encoded value according to the condition operator in the CCRB, and setting the return code indicating the outcome of the comparison.

EFS01 processing is illustrated in Table XVII and consists essentially of encoding and then extracting the EFS control field of each input record according to the control information contained in the control field control block. EFS01 initially sets up the work area specified in the control block and then selects the encoding routine based upon the ordering type specified in the encode request block corresponding to the control field being operated on. The control field is encoded and then extracted. Multiple control fields are encoded and extracted in the sequence established by the ERB queue in the CFCB. This is accomplished essentially by executing a DO loop to encode/extract each control field. When all of the input records have been appropriately processed by EFS01 44, SORT 21 operates on the translated collating characteristics as required.

When the record processing is completed, SORT 21 makes major call 4, enabling EFS 22 to pass any pending messages through major call logic 49. The logic 50 for major call 5 permits EFS 22 to delete tables and modules and to free storage.

[SJ16LPA.J15]                                                           DOCKET NO. SA9-86-026

TABLE I: JCL INVOCATION

```
//EXAMPLE   JOB  A12345,'J. SMITH'                                          1
//S1 EXEC   PGM=SORT,PARM='EFS=AKSLKJST,NOLISTX',REGION=1000K               2
//STEPLIB   DD   DSNAME=DFSORTR9.LIBRARY,DISP=SHR                           3
//          DD   DSNAME=DBCSOSR2.LIBRARY,DISP=SHR
//SYSOUT    DD   SYSOUT=A                                                   4
//SORTIN    DD   DSNAME=SMITH.INPUT,DISP=OLD                                5
//KJSRTBL   DD   DSNAME=DBCSOS.LIBRARY,DISP=SHR                             6
//SORTWK01  DD   UNIT=SYSDA,SPACE=(CYL,(3,1))                               7
//SORTOUT   DD   DSNAME=SMITH.OUTPUT,DISP=(NEW,KEEP),                       8
//     UNIT=3380,SPACE=(TRK,(15,2)),VOL=SER=XYZ003
//SYSIN     DD   *                                                          9
   SORT   FIELDS=(1,20,KO,(ASG,P=(30,35,E)),                               10
              31,4,BI,D)
   OMIT   COND=(4,20,PRD,EQ,G'<EFSPGM data>')                              11
   OPTION STOPAFT=500,LISTX                                                12
/*
```

TABLE II: APPLICATION INVOCATION

```
//EXAMPLE   JOB  A12345,'J. SMITH'
//ASMSRTP   EXEC PGM=IFOX00
//SYSPRINT  DD   SYSOUT=A
//SYSLIB    DD   DSN=SYS1.MACLIB,DISP=SHR
//SYSUT1    DD   UNIT=SYSDA,SPACE=(1700,(600,100))
//SYSUT2    DD   UNIT=SYSDA,SPACE=(1700,(600,100))
//SYSUT3    DD   UNIT=SYSDA,SPACE=(1700,(600,100))
//SYSPUNCH  DD   DSN=&&SORTOBJ1(PGMINV),DISP=(,PASS),
//              UNIT=SYSDA,SPACE=(TRK,(2,2,2))
//SYSIN     DD   *
PGMINV     CSECT
             .
             .
             .
           LA      R1,PARLST31      SET ADDRESS OF PARAMETER LIST TO      1
*                                   BE PASSED TO DFSORT
           LINK    EP=SORT          INVOKE DFSORT                         2
             .
             .
             .
           BR      R14              RETURN TO DFSORT
PARLST31   DC      A(CNTLSTMT)      ADDRESS TO THE CONTROL STATEMENTS     3
           DC      A(0)             ADDRESS OF USER EXIT E15
           DC      A(0)             ADDRESS OF USER EXIT E35
           DC      A                USER EXIT ADDRESS CONSTANT
           DC      F'-1'            INDICATE END OF LIST
CNTLSTMT   DS      0H               CONTROL STATEMENT AREA                4
           DC      AL2(CTLEND-CTLSTART) LENGTH OF CONTROL STMT STRING
CTLSTART   DS      0H                                                     5
           DC      C'  SORT   FIELDS=(1,20,KO,(ASG,P=(30,35,E)),'
           DC      C'31,4,BI,D) '
           DC      C'  OMIT   COND=(4,20,PRD,EQ,G'<EFSPGM data>') '
           DC      C'  OPTION EFS=AKSLKJST '                              6
CTLEND     EQU     *                DUMMY STMT INDICATES END OF CONTROL STMTS
             .
             .
             .
           END
```

```
//LINKA    EXEC PGM=IEWL,PARM='XREF,LET,LIST,NCAL'
//SYSPRINT DD SYSOUT=Z
//OBJ      DD DSN=&&SORTOBJ1,DISP=(OLD,PASS)
//SYSLMOD  DD DSN=&&TEMP1,DISP=(,PASS),
//            UNIT=SYSDA,SPACE=(1024,(50,20,1))
//SYSLIN   DD *
 INCLUDE OBJ(PGMINV)
 ENTRY PGMINV
 NAME PGMINV(R)
/*
//SORT     EXEC PGM=PGMINV,REGION=1000K
//STEPLIB  DD  DSNAME=DFSORTR9.LIBRARY,DISP=SHR
//         DD  DSNAME=DBCSOSR2.LIBRARY,DISP=SHR
//         DD  DSNAME=&&TEMP1,DISP=(OLD,DELETE)
//SYSOUT   DD  SYSOUT=A
//SORTIN   DD  DSNAME=SMITH.INPUT,DISP=OLD
//KJSRTBL  DD  DSNAME=DBCSOS.LIBRARY,DISP=SHR
//SORTWK01 DD  UNIT=SYSDA,SPACE=(CYL,(3,1))
//SORTOUT  DD  DSNAME=SMITH.OUTPUT,DISP=(NEW,KEEP),
//             UNIT=3380,SPACE=(TRK,(15,2)),VOL=SER=XYZ003
//SORTCNTL DD*
         OPTION STOPAFT=500,LISTX
/*
```

TABLE III:   SORT MAJOR CALL 1 PROCESSING

```
/* Initialize the portion of the EFS Interface Parameter List */
/* for major call 1                                           */
 Set the Action Code to zero
 Set bit 2 of Informational Flags according
    to the SORT invocation method
 Set bit 3 of Informational Flags according
    to the presence of the SORTDIAG JCL statement
 Call the EFS program for major call 1
 If the contents of register 15 = 16 then
 do;
    Terminate SORT
 end;
 else if the contents of register 15 ¬= 0 then
      do;
         Issue error message
      end;
/* Process the portion of the EFS Interface Parameter List */
/* that SORT allows the EFS program to change for          */
/* major call 1                                            */
 Save the address to the EFS Context Area
 If the address to the Verb Request List has not been sent then
 do;
    Set off flag to indicate EFS processing is not in effect
 end;
 else
 do;
    Save the address to the Verb Request List
 end;
 If the address to the Message Chain has been sent then
 do;
    Print the messages in the Message Chain
 end;
```

TABLE IV: SORT MAJOR CALL 2 PROCESSING

```
/* Go into a loop to send all control statements or EXEC PARMs, */
/* requested by the EFS program, to the EFS program             */
 Do while more control statements or EXEC PARMs are to be processed;
/* Initialize the portion of the EFS Interface Parameter List   */
/* for major call 2                                             */
   Set the Action Code to four
   Set the address to the Original Verb or EXEC PARM
   Set the address to the Length of the Original Verb or EXEC PARM
   Set bits 0 and 1 of Informational Flags according
     to the source of the control statement or EXEC PARM
   Set bits 4 and 5 of Informational Flags according
     to what SORT application is in effect
   Call the EFS program for major call 2
   If the contents of register 15 = 16 then
   do;
     Terminate SORT
   end;
   else if the contents of register 15 ¬= then
        do;
          Issue error message
        end;
/* Process the portion of the EFS Interface Parameter List      */
/* that SORT allows the EFS program to change for               */
/* major call 2                                                 */
   If bit flag 8 = 1 then
   do;
     Set a flag indicating that this control statement or EXEC PARM
       should be parsed by SORT
     Save the control statement or EXEC PARM returned by the EFS
       program
   end;
   else
   do;
     Set a flag indicating that this control statement or EXEC PARM
       should not be parsed by SORT
     Save the control statement or EXEC PARM returned by the EFS
       program
   end;
   If the address to the Message Chain has been sent then
   do;
     Print the messages in the Message Chain
   end;
   end;  /* End of Do while loop */
```

TABLE V: SORT INCLUDE/OMIT CODE GENERATION

```
/* Generate code for INCLUDE/OMIT EFS and non-EFS fields         */
/*   according to "AND", "OR", or "parenthesis" evaluation.      */
 Do while more INCLUDE/OMIT condition fields;

If non-EFS condition fields
   then do;
           Generate INCLUDE/OMIT logic code to compare
             field-to-field or field-to-constant;
        end;
   else if EFS condition field
        then do;
/* A set of code to call the EFS02 exit routine is generated     */
/*   for each INCLUDE/OMIT EFS condition field because each call */
/*   gets a unique correlator identifier.                        */
```

```
                Generate code to call the EFS02 exit routine;
                    (A BAL assembly instruction is generated:
                        BAL R1,0(R2) - R2 points at area after BAL
                            instruction.
                    which, when executed, will have R1 point to
                    the EFS02 parameter list.)
                Reserve storage area for EFS02 parameter list;
                    (The EFS02 parameter list area is reserved
                    right after the BAL instruction.)
                Store the Correlator Identifier into the
                    EFS02 parameter list;
                Store the address to the EFS Context Area into the
                    EFS02 parameter list;
                Generate code to test the return code
                    in register 15 for 0, 4, 16, or other (invalid);
            end;

End;  /* End of Do While for more INCLUDE/OMIT fields                */

TABLE VI:   SORT MAJOR CALL 3 PROCESSING

/*  Initialize the portion of the EFS Interface Parameter List       */
/*  for major call 3                                                 */
 Set the Action Code to eight
 Set the address to the Record Lengths List
 Set the address to the Extract Buffer Offsets
 Set bits 4 and 5 of Informational Flags according
    to what SORT application is in effect
 Set bit 7 of Informational flags according
    to what type of records are being processed
 Call the EFS program for major call 3
 If the contents of register 15 = 16 then
 do;
    Terminate-SORT
 end;
 else if the contents of register 15 ¬= 0 then
        do;
           Issue error message
        end;
/* Process the portion of the EFS Interface Parameter List           */
/* which SORT changes for major call 3                               */
 If the address to the EFS01 exit routine has been sent then
 do;
    Save the address to the EFS01 exit routine
 end;
 If the address to the EFS02 exit routine has been sent then
 do;
    Save the address to the EFS02 exit routine
 end;
 If the address to the Message Chain has been sent then
 do;
    Print the messages in the Message Chain
 end;

TABLE VII:  SORT SORT/MERGE CODE GENERATION

/*  Only one set of code to call the EFS01 exit routine              */
/*     is required.                                                  */
   If SORT/MERGE EFS control field(s) specified
   then do;
```

```
            Generate code to call the EFS01 exit routine;
               (A BAL assembly instruction is generated:
                  BAL R1,0(R2) - R2 points at area after BAL instruction
               which, when executed, will have R1 point to
               the EFS01 parameter list.)
            Reserve storage area for EFS01 parameter list;
               (The EFS01 parameter list area is reserved
                right after the BAL instruction.)
            Store the address to the EFS Context Area into the
               EFS01 parameter list;
            Generate code to test the return code
               in register 15 for 0, 16, or other (invalid);
         End;  /* End of EFS fields */

/* Generate code for SORT/MERGE non-EFS control fields              */
   Do while more SORT/MERGE non-EFS control fields;
      Generate code to move the non-EFS control field from the
         input record to the extract area;
/* End of Do While for more SORT/MERGE non-EFS control fields       */
   End;

TABLE VIII:  SORT INCLUDE/OMIT LOGIC PROCESSING

/* Execute the INCLUDE/OMIT logic according to the                  */
/*    "AND", "OR", or "parenthesis" evaluation.                     */
Do while "AND", "OR", or "parenthesis" prevails;

If a non-EFS condition field
   then do;
         Execute field-to-field or field-to-constant comparison logic;
         end;  /* End If for non-EFS condition field */ else do:   /* Do INCLUDE/OMIT EFS condition field logic */

/* Initialize the parameter list used by the EFS02 exit routine */

/* The Correlator Identifier has previously been set          */
      /*    in the EFS02 plist at INCLUDE/OMIT code generation time. */
         Set the address to the Input Record
      /* The address to the EFS Context Area has previously been set */
      /*    in the EFS02 plist at INCLUDE/OMIT code generation time. */
         Call the EFS02 exit routine
         If the contents of register 15 = 16 then
         do;
           Terminate SORT
         end;
         else if the contents of register 15 = 0 (true) then
               do;
                 Include the record if INCLUDE being processed or
                 Omit the record if OMIT being processed;
               end;
               else if the contents of register 15 = 4 (false) then
                     do;
                        Omit the record if INCLUDE being processed or
                        Include the record if OMIT being processed;
                     end;
                     else issue error message; /* Invalid return code.*/
         end;  /* End If for EFS field */ end;  /* End Do while for "AND", "OR", or "parenthesis" evaluation  */
```

TABLE IX: SORT EFS01 PROCESSING

```
/* Initialize the parameter list used by the EFS01 exit routine   */
  Set the address to the Extract Buffer Area
  Set the address to the Input Record
/* The address to the EFS Context Area has previously been set    */
/*    in the EFS01 plist at SORT/MERGE code generation time.      */
  Call the EFS01 exit routine
  If the contents of register 15 = 16 then
  do;
    Terminate SORT
  end;
  else if the contents of register 15 ¬= 0 then
      do;
        Issue error message;  /* Invalid return code.  */
      end;
```

TABLE X: EFS MAJOR CALL 1 PROCESS MODULE

```
/*  LOAD VRL                                                              */
/*  IF LOAD SUCCESSFUL THEN                                               */
/*      SAVE ITS ADDRESS                                                  */
/*  ELSE                                                                  */
/*      GO TO ERROR EXIT                                                  */
/*                                                                        */
/*  GETMAIN CONTEXT AREA, CONTROL BLOCK AREAS AND MESSAGE SAVE AREA       */
/*  IF GETMAIN FAILED THEN                                                */
/*      SET MESSAGE IN MESSAGE CHAIN INDICATING GETMAIN FEATURE           */
/*      SET RETURN CODE 16                                                */
/*      RETURN TO CALLER                                                  */
/*  ELSE                                                                  */
/*      NULL                                                              */
/*  INITIALIZE CONTROL BLOCKS AND MESSAGE SAVE AREA                       */
/*                                                                        */
/*  SET UP MESSAGE GENERATION PARAMETERS BY SELECTING AND                 */
/*  SAVING LANGUAGE POINTER                                               */
/*  RETURN                                                                */
```

TABLE XI: EFS MAJOR CALL 2 PROCESS MODULE

```
/*  PROCESS : INITIALIZE PARSING ROUTINE                                  */
/*  INITIALIZE MODIFIED VERB ADDRESS                                      */
/*  INITIALIZE MODIFIED VERB LENGTH                                       */
/*  SET VERB PROCESS OPTION FLAG 'ON'                                     */
/*                                                                        */
/*  SET RESOLUTION TABLE POINTER TO 0                                     */
/*                                                                        */
/*  GETMAIN RESOLUTION & COMPOSITION TABLE AREA                           */
/*  ADDRESS RESOLUTION & COMPOSITION TABLE                                */
/*                                                                        */
/*  CALL VERB STRING RESOLUTION ROUTINE                                   */
/*                                                                        */
/*  INITIALIZE PARAMETERS TO PARSE                                        */
/*  ADDRESS VERB SUBSTRING                                                */
/*  PARSE VERB SUBSTRING                                                  */
/*                                                                        */
/*  DETECT AND SAVE KEYWORD                                               */
/*                                                                        */
/*  SELECT1 (VERB)                                                        */
```

```
/*    CALL VPROC (VERB)                                                  */
/*    END OF SELECT1          "                                          */
/*                                                                       */
/*    PROCESS : SETTLE PARSING ROUTINE                                   */
/*                                                                       */
/*    SELECT2 (INTERNAL RETURN CODE)                                     */
/*       WHEN (NO ERROR (RC=0))                                          */
/*          IF VERB NAME = SORT,MERGE,INCLUDE,OMIT THEN                  */
/*             CALL INTERNAL PROCEDURE TO COMPOSE MODIFIED VERB STRING   */
/*          ELSE                                                         */
/*             NULL                                                      */
/*       WHEN (GETMAIN FAILURE IN PARSING ROUTINE (RC=16))               */
/*          SET RETURN CODE TO 16                                        */
/*          SET MESSAGE CHAIN                                            */
/*       OTHER (RC=8)                                                    */
/*          SET MESSAGE CHAIN                                            */
/*    END OF SELECT2                                                     */
```

TABLE XII:   EFS VPROC1

```
/*    DO                                                                 */
/*       SELECT (KEYWORD)                                                */
/*          WHEN (CSES)                                                  */
/*             CALL INTERNAL PROC. TO COMPLETE CSES TABLE INFORMATION    */
/*          WHEN (CSER)                                                  */
/*             CALL INTERNAL PROC. TO COMPLETE CSER TABLE INFORMATION    */
/*          WHEN (CSTS)                                                  */
/*             CALL INTERNAL PROC. TO COMPLETE CSTS TABLE INFORMATION    */
/*          WHEN (CSTR)                                                  */
/*             CALL INTERNAL PROC. TO COMPLETE CSTR TABLE INFORMATION    */
/*          WHEN (DYT)                                                   */
/*             CALL INTERNAL PROC. TO COMPLETE DYTY/P TABLE INFORMATION  */
/*          WHEN (CHECK)                                                 */
/*             CALL INTERNAL PROC. TO COMPLETE CHECK OPTION              */
/*       END OF SELECT                                                   */
/*    RETURN                                                             */
```

TABLE XIII:   SM PROC MODULE

```
/* FUNCTION: PARSE SORT/MERGE VERB REFERRING TO RESOLUTION TABLE         */
/*           & MAKE UP COMPOSITION TABLE                                 */
/*                                                                       */
/* 1. IF FORMAT= KEYWORD IS SPECIFIED, CHECK THE VALUE AND RETURN        */
/*    TO CALLER WITHOUT MODIFICATION.                                    */
/* 2. SCAN THE WHOLE FIELDS KEYWORD VALUE TO COUNT THE NUMBER OF         */
/*    EFS CONTROL FIELDS.                                                */
/* 3. GETMAIN AND INITIALIZE CONTROL FIELD CONTROL BLOCK.                */
/* 4. SCAN THE WHOLE FIELDS KEYWORD VALUE, SAVE EFS FIELD                */
/*    INFORMATION IN CONTROL FIELD CONTROL BLOCK AND RESERVE             */
/*    TABLES AND ENCODE MODULES.                                         */
/*                                                                       */
/* INPUT:                                                                */
/*                                                                       */
/*    EFS CONTEXT AREA                                                   */
/*    RESOLUTION TABLE ADDRESS                                           */
/*    COMPOSITION TABLE ADDRESS                                          */
/*    SUBSCRIPT TO CONTINUE PARSING                                      */
/*                                                                       */
/* OUTPUT:                                                               */
/*                                                                       */
```

```
/*      RETURN CODE                                                      */
/*      MODIFIED VERB AREA ADDRESS                                       */
/*      MODIFIED VERB AREA LENGTH                                        */
/*      COMPOSITION TABLE                                                */
/*                                                                       */
/*           COMMON SUBROUTINE TO PROCESS 'KS' & 'KR' PARSING             */
/*                                                                       */
/*   PROCESS :                                                           */
/*                                                                       */
/*   1. CONVERT EFS CONTROL FIELD OFFSET & LENGTH TO BINARY              */
/*   2. REQUEST TABLE CORRESPONDING WITH THE ORDERING TYPE               */
/*   3. ENTER "D1" INTO COMPOSITION TABLE                                */
/*   4. RETURN TO CALLER                                                 */
/*                                                                       */
/*           COMMON SUBROUTINE TO PROCESS 'KO' & 'KE' PARSING             */
/*                                                                       */
/*   PROCESS :                                                           */
/*                                                                       */
/*   1. CONVERT EFS CONTROL FIELD OFFSET & LENGTH TO BINARY              */
/*   2. GET ORDERING SEQUENCE & SUBORDERING TYPE                         */
/*   3. CONVERT PRONUNCIATION DATA OFFSET & LENGTH TO BINARY             */
/*   4. REQUEST TABLE CORRESPONDING WITH THE ORDERING TYPE               */
/*   5. ENTER "D1" INTO COMPOSITION TABLE                                */
/*   6. RETURN TO CALLER                                                 */
/*                                                                       */
/*           COMMON SUBROUTINE TO PROCESS 'KI' & 'KP' PARSING             */
/*                                                                       */
/*   PROCESS :                                                           */
/*                                                                       */
/*   1. CONVERT EFS CONTROL FIELD OFFSET & LENGTH TO BINARY              */
/*   2. GET ORDERING SEQUENCE & SUBORDERING TYPE                         */
/*   3. CONVERT PRONUNCIATION DATA OFFSET & LENGTH TO BINARY             */
/*   4. CONVERT MAPPING DATA OFFSET TO BINARY                            */
/*   5. REQUEST TABLE CORRESPONDING WITH THE ORDERING TYPE               */
/*   6. ENTER "D1" INTO COMPOSITION TABLE                                */
/*   7. RETURN TO CALLER                                                 */
```

TABLE XIV: EFS IOM PROC

```
/* FUNCTION: PARSE INCLUDE/OMIT VERB REFERRING TO RESOLUTION             */
/*           TABLE & MAKE UP COMPOSITION TABLE                           */
/*                                                                       */
/* 1. IF FORMAT= KEYWORD IS SPECIFIED, CHECK THE VALUE AND RETURN        */
/*    TO CALLER WITHOUT MODIFICATION.                                    */
/* 2. SCAN THE WHOLE COND KEYWORD VALUE TO COUNT THE NUMBER OF           */
/*    EFS CONDITION FIELDS.                                              */
/* 3. GETMAIN AND INITIALIZE CONDITION CONTROL BLOCK.                    */
/* 4. SCAN THE WHOLE COND KEYWORD VALUE, SAVE EFS CONDITION              */
/*    FIELD INFORMATION IN CONDITION CONTROL BLOCK AND RESERVE           */
/*    TABLES AND ENCODE MODULES.                                         */
/*                                                                       */
/* INPUT:                                                                */
/*                                                                       */
/*    EFS CONTEXT AREA                                                   */
/*    RESOLUTION TABLE ADDRESS                                           */
/*    COMPOSITION TABLE ADDRESS                                          */
/*    SUBSCRIPT TO CONTINUE PARSING                                      */
/*    (TOP OF KEYWORD EX.'COND=')                                        */
/*                                                                       */
/* OUTPUT:                                                               */
/*                                                                       */
/*    RETURN CODE                                                        */
/*    MODIFIED VERB AREA ADDRESS                                         */
/*    MODIFIED VERB AREA LENGTH                                          */
/*    COMPOSITION TABLE                                                  */
/*                                                                       */
```

TABLE XV: EFS MAJOR CALL 3 PROCESS MODULE

```
/*  PROCESS : INITIALIZE PARAMETERS                                    */
/*                                                                     */
/*  ADDRESS TABLE CONTROL BLOCK                                        */
/*  ADDRESS MODULE CONTROL BLOCK                                       */
/*  ADDRESS CONTROL FIELD CONTROL BLOCK                                */
/*  ADDRESS CONDITION CONTROL BLOCK                                    */
/*                                                                     */
/*  PROCESS : SAVE EXTRACT BUFFER OFFSETS INTO CONTROL FIELD           */
/*            INFORMATION BLOCK FOR EACH EFS CONTROL FIELD             */
/*                                                                     */
/*  PROCESS : LOAD REQUIRED TABLES                                     */
/*                                                                     */
/*  LOAD REQUIRED TABLES                                               */
/*  IF LOAD FAILED THEN                                                */
/*     GO TO ERROR EXIT, WHERE                                         */
/*         ISSUE ERROR MESSAGE - TABLE LOAD FAILED                     */
/*         SET RETURN CODE 16                                          */
/*         RETURN TO CALLER                                            */
/*     END IFTHEN                                                      */
/*  ELSE                                                               */
/*    NULL                                                             */
/*                                                                     */
/*  PROCESS : LOAD REQUIRED ENCODE MODULES                             */
/*                                                                     */
/*  LOAD REQUIRED ENCODE MODULES                                       */
/*  IF LOAD FAILED THEN                                                */
/*     GO TO ERROR EXIT, WHERE                                         */
/*         ISSUE ERROR MESSAGE - MODULE LOAD FAILED                    */
/*         SET RETURN CODE 16                                          */
/*         RETURN TO CALLER                                            */
/*     END IFTHEN                                                      */
/*  ELSE                                                               */
/*    NULL                                                             */
/*                                                                     */
/*  PROCESS : COMPLETE CONTROL FIELD CONTROL BLOCK - PART 1            */
/*            MOVE TABLE ADDRESS IN TABLE CONTROL BLOCK TO ENCODE      */
/*            REQUEST BLOCK CORRESPONDING TO ORDERING TYPE             */
/*                                                                     */
/*  PROCESS : COMPLETE CONTROL FIELD CONTROL BLOCK - PART 2            */
/*            MOVE ENCODE ROUTINE ADDRESS                              */
/*            TO ENCODE REQUEST BLOCK                                  */
/*                                                                     */
/*  PROCESS : COMPLETE CONDITION CONTROL BLOCK - PART 1                */
/*                                      (LEFT & RIGHT HAND)            */
/*            MOVE TABLE ADDRESS FROM TABLE CONTROL BLOCK TO           */
/*            CONDITION CONTROL BLOCK CORRESPONDING TO ORDERING        */
/*            TYPE                                                     */
/*                                                                     */
/*  PROCESS : COMPLETE CONDITION FIELD CONTROL BLOCK - PART 2          */
/*            MOVE ENCODE ROUTINE ADDRESS FROM MODULE CONTROL          */
/*            BLOCK TO ENCODE REQUEST BLOCK (LEFT & RIGHT HAND)        */
/*                                                                     */
/*  PROCESS : LOAD AEFS01 IF REQUIRED                                  */
/*                                                                     */
/*  IF THERE IS EFS CONTROL FIELD THEN                                 */
/*     LOAD MODULE                                                     */
/*     SAVE ENTRY ADDRESS BLOCK                                        */
/*                                                                     */
/*  PROCESS : LOAD EFS02 IF REQUIRED                                   */
/*                                                                     */
/*  IF THERE IS EFS COND FIELD THEN                                    */
/*     LOAD ESS02 MODULE                                               */
/*     SAVE ENTRY ADDRESS BLOCK                                        */
/*                                                                     */
```

TABLE XVI: EFS02

```
*"Determine the True or False of the Include/Omit condition           *
*      identified by the Correlator_Id and set Return_Code            *
*      accordingly, Queue messages if there are any".                 *
*                                                                     *
*  Perform comparison according to the operator.                      *
*  Set return code.                                                   *
*End.                                                                 *
*                                                                     *
```

TABLE XVII: EFS01

```
*" Encode control fields in Input_Record into Extract_Buffer ".       *
*  Type Context_Cblk = Rec                                            *
*     Encode_Requests: Queue of Encode_Req_Blk.                       *
*  Do " Initialization "                                              *
*  " Validate Input Record and Parameters "                           *
*  " Process every Encode_Request "                                   *
*     Do " Common Set up for Encode_Work ".                           *
*     End.                                                            *
*     " Set up depending on the Ordering_Type "                       *
*     Select (Ordering_Type)                                          *
*     When (KS or KR)                                                 *
*     " Encode and Extract for Total Stroke or Radical Stroke ".      *
*     When (KO)                                                       *
*     " Encode and Extract for Kokugo Jiten, or Japanese Dictionary ".*
*     When (KI)                                                       *
*     " Encode and Extract for Kanji Index ".                         *
*     When (KE)                                                       *
*     " Encode and Extract for Simple Telephone ".                    *
*     When (KP)                                                       *
*     " Encode and Extract for Full Telephone Directory ".            *
*     End.                                                            *
*                                                                     *
```

Obviously, many variations of the described invention can be practiced without departing from the scope or spirit of the invention. Thus, it is to be understood that the descriptions and illustrations used in the Abstract and Specification do not limit the invention, nor do they exclude equivalents of the characteristics illustrated, described, or claimed. The invention is limited solely by the claims which follow.

We claim:

1. A method for concurrently executing a first (DFSORT) and a second (EFS) cooperating sequential process on a computing system, said first process for permuting a string of first records with first collating characteristics in response to control statements executable by said first process, said control statements being executable by said first process in response to said first records, said second process including means for altering control, statements, said method comprising the steps of:

while said computing system is under control of said first process, inputting a set of control statements and an input string of records, said records including second records with second collating characteristics, said set of control statements including a subset of control statements executable only in response to said second collating characteristics;

transferring control of said computing system to said second process;

modifying the control statements of said subset of control statements to a form executable by said first process in response to records with said first collating characteristics;

adding counterpart first collating characteristics to said second records;

transferring control of said computing system to said first process; and permutatively processing said input string into an output string including said second records by executing said modified control statements in response to said added counterparts first collating characteristics.

2. The method of claim 1, wherein said subset includes a SORT statement.

3. The method of claim 1, wherein said subset includes a MERGE statement.

4. A method for concurrently executing a first (DFSORT) and a second (EFS) cooperating sequential process on a computing system, said first process being adapted to generate commands for forming an output string of records from an input string of first records having first collating characteristics in response to control statements executable by said first process upon said first records, said second process including a modality for altering control statements, said method comprising the steps of:

while said computing system is under control of said first process, inputting a set of control statements and an input string of records including second records with second collating characteristics, said set of control statements including a subset of control statements executable only on records including said second collating characteristics;

transferring control of said computing system to said second process;

modifying the control statements of said subset to a form executable by said first process upon records with said first collating characteristics;

in response to said modified control statements, concurrently executing said first and second processes upon said input file to filter said second records;

transferring control of said computing system to said first process; and forming an output file including filtered second records.

5. The method of claim 4 further including the step of:

while said computing system is under the control of said second process, generating from said input string a counterpart string of first collating characteristics;

and wherein said string of executing includes executing altered control statements upon said counterpart string to produce an output string from said second records.

6. In a method for operating a computer system under control of a SORT program in which a plurality of input first records having first collating characteristics, and input to said computer system, are collated into a file for output from said computer system, an improvement for operating said computer system under control of said SORT program and an extended function program to collate a plurality of second records having second collating characteristics from an input file to an output file, said extended function program including a modality for modifying control statements and records, said improvement comprising the steps of:

under control of said SORT program, inputting said input file and a set of control statements for operating on said input file to said computer system, said set of control statements including a subset of control statements executable only upon said second records;

in response to said second collating characteristics, calling said extended function program;

under control of said extended function program, altering the control statements of said subset of control statements to obtain commands executable by said SORT program;

returning control of said computer system to said SORT program; and executing said commands to collate said second records into said output file.

7. The method of claim 6, further including the step of:

while said computer system is under control of said extended function program, generating from said input file a counterpart file of records with said first collating characteristics;

and, wherein said step of executing includes executing said subset of altered control statements upon said counterpart file of records to produce said output file from said second records.

8. The method of claim 7 wherein said subset of control statements includes a SORT control statement.

9. The method of claim 7 wherein subset of control statement includes a MERGE control statement.

10. The method of claim 6, further including the steps of:

while said computer system is under the control of said extended function program, obtaining a second record;

partially executing a respective one of said altered control statements upon said second record; and wherein said step of executing includes completing the execution of said respective one of said altered control statements upon said second record by including said second record in said output file.

11. The method of claim 10 wherein said respective one of said altered control statements is INCLUDE control statement.

12. The method of claim 10 wherein said respective one of said altered control statements is an OMIT control statement.

* * * * *